(12) United States Patent
Baker et al.

(10) Patent No.: US 9,286,884 B2
(45) Date of Patent: Mar. 15, 2016

(54) SEQUENCED MULTI-MEANING TACTILE SYMBOLS USEABLE TO PRODUCE SYNTHETIC PLURAL WORD MESSAGES INCLUDING WORDS, PHRASES AND SENTENCES

(75) Inventors: Bruce R. Baker, Pittsburgh, PA (US); Robert V. Conti, Pittsburgh, PA (US); Katya Hill, Pittsburgh, PA (US); Thomas Kovacs, Pittsburgh, PA (US); Barry Romich, Wooster, OH (US)

(73) Assignee: SEMANTIC COMPACTION SYSTEMS, INC., Pittsburgh, PA (US)

( * ) Notice: Subject to any disclaimer, the term of this patent is extended or adjusted under 35 U.S.C. 154(b) by 849 days.

(21) Appl. No.: 13/293,208

(22) Filed: Nov. 10, 2011

(65) Prior Publication Data

US 2012/0123784 A1 May 17, 2012

Related U.S. Application Data

(60) Provisional application No. 61/344,905, filed on Nov. 12, 2010.

(51) Int. Cl.
*G09B 21/00* (2006.01)
*G10L 13/027* (2013.01)
(Continued)

(52) U.S. Cl.
CPC ............ *G10L 13/027* (2013.01); *G09B 21/002* (2013.01); *G09B 21/005* (2013.01); *G09B 21/007* (2013.01); *G09B 21/008* (2013.01); *G06F 3/0482* (2013.01); *G06F 3/0488* (2013.01); *G06F 3/04886* (2013.01); *G09B 21/00* (2013.01); *G09B 21/003* (2013.01)

(58) Field of Classification Search
CPC . G06F 3/0488; G06F 3/0482; G06F 3/04886; G09B 21/00; G09B 21/001; G09B 21/002; G09B 21/003
USPC ........... 340/4.12, 407.1, 407.2; 434/113, 114; 715/702, 823, 835
See application file for complete search history.

(56) References Cited

U.S. PATENT DOCUMENTS 4,661,916 A 4/1987 Baker et al.
4,940,346 A * 7/1990 Liljenquist .................... 400/487
(Continued)

OTHER PUBLICATIONS

International Preliminary Report on Patentability dated May 23, 2013.
(Continued)

*Primary Examiner* — Steven Lim
*Assistant Examiner* — Benyam Haile
(74) *Attorney, Agent, or Firm* — Harness, Dickey & Pierce, P.L.C.

(57) ABSTRACT

An embodiment of the present application is directed to a method including providing a keyboard, including a plurality of keys, at least some of the keys including polysemous symbols which provide distinctive tactile feedback to a user; and accessing a word, phoneme or plural word message, based upon sequentially selected ones of the polysemous symbols providing distinctive tactile feedback. Another embodiment of the present application is directed to a system, including a keyboard, including a plurality of keys, at least some of the keys including polysemous symbols which provide distinctive tactile feedback to a user; and a processor to access a word, phoneme or plural word message, based upon sequentially selected ones of the polysemous symbols providing distinctive tactile feedback.

52 Claims, 14 Drawing Sheets

(51) Int. Cl.
*G06F 3/0488* (2013.01)
*G06F 3/0482* (2013.01)

(56) References Cited

U.S. PATENT DOCUMENTS

| | | |
|---|---|---|
| 5,297,041 A | 3/1994 | Kushler et al. |
| 5,748,177 A * | 5/1998 | Baker et al. ................... 345/172 |
| 5,920,303 A | 7/1999 | Baker et al. |
| 6,535,201 B1 * | 3/2003 | Cooper et al. ................. 345/173 |
| 2006/0014123 A1 * | 1/2006 | Hanley .......................... 434/113 |
| 2008/0131849 A1 * | 6/2008 | Kyung et al. .................. 434/114 |

OTHER PUBLICATIONS

Taiwanese Office Action mailed Aug. 13, 2015.

\* cited by examiner

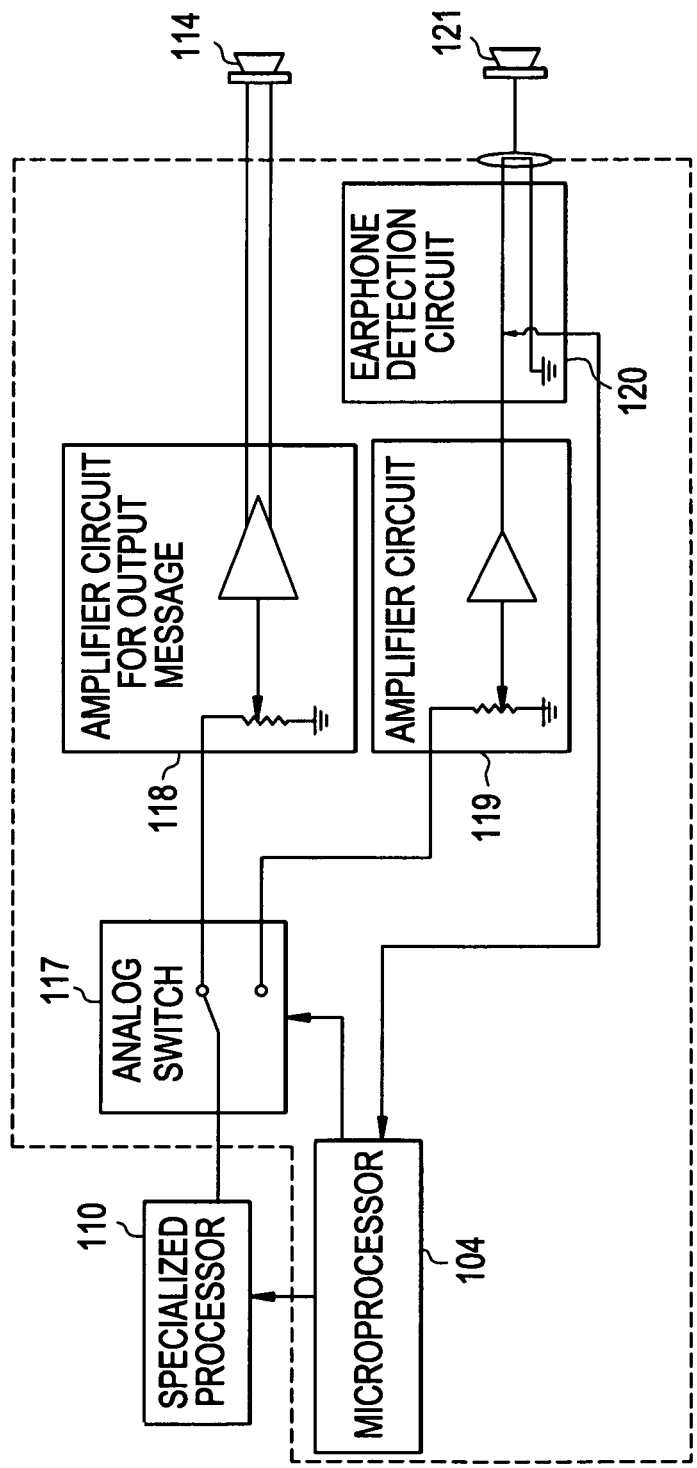

SEQUENCED MULTI-MEANING TACTILE SYMBOLS USEABLE TO PRODUCE SYNTHETIC PLURAL WORD MESSAGES INCLUDING WORDS, PHRASES AND SENTENCES

PRIORITY STATEMENT

The present application hereby claims priority under 35 U.S.C. §119(e) on U.S. provisional patent application No. 61/344,905 filed Nov. 12, 2010, the entire contents of which are hereby incorporated herein by reference.

FIELD

At least one embodiment of the present application generally relates to symbol sequencing devices.

BACKGROUND

Previously, a system and method for producing synthetic single or plural word messages was developed by Bruce Baker et al. and is disclosed in U.S. Pat. No. 4,661,916 to Baker et al. (the Baker '916 patent), issued on Apr. 28, 1987, the entire contents of which are hereby incorporated herein by reference. The system was directed to a linguistic coding system and keyboard for use by people with cognitive and/or physical impairments. The coding system and associated keyboard was used to store and access messages, which included plural word messages, sentences, phrases, full names, letters, numbers, functions, or any combination thereof.

In such a system, the keyboard was coupled to a computer device, or was alternately part of the stand-alone entity which included a microprocessor, memory and display. The memory stored the messages for selective retrieval by the keyboard. The messages retrieved from the keyboard were then fed to a voice synthesizer, for example, which converted them through a loudspeaker to produce audible spoken messages. On this keyboard, associated with each of a plurality of keys, were polysemous (many-meaning) symbols, also known as icons. By designating selected ones of the keys and their associated symbols or icons, selected stored messages or plural word messages (including but not limited to words, phrases and sentences) were accessed from the memory and then subsequently output.

With the system described in the Baker '916 patent, messages stored in the memory could be retrieved by activating a combination of symbol keys and other keys to vary the context of the polysemous symbols. Thus, a plurality of sentences could be selectively generated as a function of polysemous symbols in combination with other polysemous symbols. This allowed a user the ability to access thousands of words or messages based upon as little as one, two, or three keystrokes. Further, with symbols being polysemous, thousands of symbol sequences could be generated with only a small number of keys on a keyboard. Based upon ease of use of the system, the polysemous icons or symbols utilized, and the easily memorized symbol sequence combinations, such a system became ideal for many mentally and physically challenged users for whom spelling and typing, as well as speech itself, was extremely difficult.

The system of the Baker '916 patent allowed for an operator to go directly from thought to speech. This was possible because each key of the keyboard bore a central image or symbol which was polysemous and illustrated an important aspect of life and/or linguistic function. The keyboards could be varied depending on the intellectual level of the intended operator. Therefore, each keyboard could in itself be a language which was designed for or with a specific user.

Each of the polysemous symbols was developed to be rich in associations and in combination, signal sentence or message ideas in the operator's memory. This enabled the generation of plural word or whole sentence messages by the activation of only a limited number of keys. The device allowed for the generation of many sentences or phrases and a large core vocabulary which could be easily retrieved from memory because of the ease with which the polysemous symbols on the keys portrayed the production of whole thoughts.

In the aforementioned system of the Baker '916 patent, the spatial configuration of the symbols on a given keyboard remained constant. Sequences of icons in fixed places were consistent, allowing messages to be reliably produced with the same sequence each time. This constant mapping supported the learning of motor patterns associated with icon sequences. As such sequences were learned, the user could establish motor programs that allow sequences to be produced quickly and accurately in the same way a touch typist efficiently spelled many words or a musician played an instrument.

The aforementioned Baker '916 patent provided an excellent means of accessing high frequency "core" vocabulary words using sequenced polysemous symbols. However, the system of the Baker '916 patent only provided limited access to the relatively large set of low frequency "fringe" vocabulary words that would only be used periodically.

A subsequent design that provided for a way to easily access fringe vocabulary utilizing non-polysemous symbols on dynamic graphical screens was disclosed in U.S. Pat. No. 5,920,303 to Baker et al. (the Baker '303 patent), issued Jul. 6, 1999, the entire contents of which is hereby incorporated herein by reference. In the system of the aforementioned Baker '303 patent, less than all of a plurality of displayed symbols on a keyboard were polysemous symbols that could be used sequentially for producing core vocabulary with the advantages of the Baker '916 patent design, and less than all of the plurality of displayed symbols on the keyboard were non-polysemous symbols for accessing fringe vocabulary. In the system of the Baker '303 patent, the less than all of a plurality of keys on the displayed keyboard including non-polysemous symbols for accessing fringe vocabulary were dynamically redefined in response to sequentially selected polysemous or non-polysemous symbols, such that both the stored message accessed by actuation of a key and the non-polysemous symbol displayed on the key were simultaneously dynamically redefined. These dynamic characteristics produced a dynamically redefined keyboard for accessing fringe vocabulary.

The aforementioned Baker '916 and Baker '303 patents provided for visually based approaches to polysemous symbolic representation, including pictorial illustrations and alpha characters. In various embodiments, these symbols have been printed on physical displays and rendered as virtual objects on computer displays.

Contemporary embodiments exist on touch screen computers. However visually based symbolic representation is presented, and as such, visual processing skills are needed to access these symbols. The use of visually based symbolic representation assumes the user has adequate vision to differentiate one symbol from the next.

Visually based polysemous and non-polysemous symbols have helped many individuals with significant speech and multiple impairments (SSMI) communicate with natural language and generate spontaneous novel utterances. However, a subset of this population does not have adequate vision to process pictorial illustrations and alpha characters. Historically, these users have relied on either memorization of button locations with no accessible symbolic representation, or auditory scanning to access language content, if a speech output system is used. Some individuals with low vision may have the option to use systems with a relatively small number of enlarged symbols and a smaller vocabulary set. Many of these individuals have had to rely on home-made tactile systems with no speech output.

If a user relies exclusively on memorization of button locations on a touch screen display or key locations on a keyboard, there is no symbolic representation associated with a location to convey meaning before the location is activated. An auditory prompting feature may be used. Auditory prompting occurs when an AAC system speaks the name of a symbol upon the first activation as a prompt, so that a second activation of the same icon is required to select it. However, the use of auditory prompting automatically doubles the number of activations that are necessary to generate any given utterance.

If a user relies on auditory scanning, communication is slower and more cognitively demanding than with direct selection techniques. The user must wait for the system to scan through a series of options in sequence, and select each target symbol in turn. Depending on the scanning method, a user may need to make as many (such as three for example) correctly timed selections to activate one symbol, and must further retain the desired utterance in memory throughout this process.

Others in the field of augmentative and alternative communications (AAC) have attempted to provide access to words, phrases, and sentences through alphabet based methods (spelling, word prediction, and orthographic word selection), and through single-meaning pictures on dynamic, graphic screens.

A person who is visually impaired or even blind may spell using a touch keyboard. As discussed in the Baker '303 patent, spelling is often slow, difficult, and laborious for people with significant speech and multiple impairments (SSMI), particularly if they have motor impairments that limit their potential for touch typing. If a chorded Braille keyboard is used for spelling, multiple keys must be actuated simultaneously to produce each character, increasing the motoric demands of spelling.

Unfortunately, many individuals with SSMI have persistent difficulty acquiring and using literacy skills. Literacy is particularly challenging for individuals who have significant speech impairments and blindness, and must learn to read and write in Braille.

Word prediction, orthographic word selection, and single meaning pictures are all strategies that are reliant on touch screen graphic displays. In word prediction, a person types one letter of a target word. The computer then presents the user with a list of words beginning with the chosen letter. The user scans the list to determine if the target word is included, then either selects the target word from the list or types the next letter if the target word is not listed.

In a single meaning picture system, an array of single meaning pictures may be presented for the user to choose from. If the size of a user's vocabulary exceeds the small number of picture locations on the screen, more screens may be progressively added. Multiple activations are necessary to navigate between many different screens and select a desired word or formulate an utterance. A user with a large vocabulary may have their vocabulary distributed across many dozen screens. Orthographic word selection functions similarly to a single meaning picture system, except that symbols consist of whole words presented in alpha characters instead of pictures.

Utilizing word prediction, orthographic word selection, or single meaning pictures on a touch screen graphic display is cognitively demanding and requires concentration, as discussed in the Baker '303 patent. These methods present additional challenges to users who are visually impaired or even blind, when they must process the information from a dynamic word prediction menu or a touch screen using other sensory modalities. A user with impaired or even without vision may need to rely on auditory prompting or auditory scanning to access such information.

Known home-made tactile symbol systems tend to be built using manual construction techniques, and tend to include symbols which are single meaning and represent low frequency fringe vocabulary. These symbol systems may be implemented as manual communication boards with no speech output capabilities, or mounted to digitized voice output devices with limited storage capacities. Using home-made tactile symbols is cognitively demanding for users, particularly when no speech output is available.

Such known systems suffer from the known limitations of many communication systems that use single meaning pictures. Additionally, most of these systems do not include voice output, and the user is burdened with the need to physically manipulate a real object for every symbol in the language system.

After reviewing clinical practice with these patients, existing technologies were examined to determine if there was a gap that explained why numerous sighted patients receive speech generating devices while most patients with visual impairments do not. In a review of user interface systems on twenty one speech generating devices from seven manufacturers, an abundance of visual language representation and auditory scanning options were found. Tactile interface options across devices and manufacturers were limited to keyguards that help users isolate targets, spelling and typing systems, and two devices which could potentially support a tactile symbol set created by consumers. Thus, the needs of these patients were not being met, in part because the available technology was not consistent with clinical practice.

Fabricating home-made tactile symbol systems further is time and labor intensive, and cannot keep pace with the development of linguistic skills. For example, a normally developing three year old has an expressive vocabulary of about 1,000 words. A 5 cm×5 cm tactile symbol to represent each of these words would require a display with at least 2.5 m×2 m of usable surface area. An attempt to keep pace with the development of linguistic skills with single meaning tactile symbols quickly produces a very large symbol set that is extremely difficult to manage.

SUMMARY

In at least one embodiment, the present application is directed to a tactile symbol system to represent language, more specifically a sequenced polysemous (many-meaning) symbol system in which each tactile symbol is polysemous and corresponds to a plurality of meanings. The tactile symbols are advantageous for users who may not see visually represented symbols due to visual impairment or blindness.

An embodiment of the present application is directed to a method including providing a keyboard, including a plurality of keys, at least some of the keys including polysemous symbols which provide distinctive tactile feedback to a user; and accessing a word, phoneme or plural word message, based upon sequentially selected ones of the polysemous symbols providing distinctive tactile feedback.

Another embodiment of the present application is directed to a system, including a keyboard, including a plurality of keys, at least some of the keys including polysemous symbols which provide distinctive tactile feedback to a user; and a processor to access a word, phoneme or plural word message, based upon sequentially selected ones of the polysemous symbols providing distinctive tactile feedback.

Yet another embodiment of the present application is directed to a method of translating representational characteristics of a polysemous graphic symbol into a tactile format, the method comprising:

determining a plurality of stored words, phonemes, messages or sentences associated with a polysemous graphic symbol of a system, the plurality of stored words, phonemes, messages or sentences being respectively accessible by actuation of the polysemous graphic symbol in sequence with respective other polysemous graphic symbols;

identifying associations between the polysemous graphic symbol and the plurality of determined stored words, phonemes, messages or sentences; and translating representational characteristics of the polysemous graphic symbol into tactile format of a tactile polysemous symbol to be associated with the determined plurality of stored words, phonemes, messages or sentences, wherein tactile characteristics of the tactile polysemous symbol relate to the identified associations. Still further, another embodiment of the method further includes positioning the developed tactile polysemous symbol on a key of a keyboard associated with the polysemous graphic symbol, effectively replacing the polysemous graphic symbol with the polysemous tactile symbol to access respective ones of the determined plurality of stored words, phonemes, messages or sentences when sequenced with respective other tactile polysemous symbols. In another embodiment of the method, the identified associations include teachable metaphors and/or the identified associations include associations with a plurality of linguistic concepts relating to the stored words, phonemes, messages or sentences and the polysemous graphic symbol. Further, in another embodiment, the teachable metaphors are useable to explain associations between the polysemous graphic symbol and underlying linguistic concepts.

Still a further embodiment of the present application is directed to a method of forming a polysemous tactile symbol from representational characteristics of a corresponding polysemous graphic symbol, the method comprising at least one of:

forming at least one part of the polysemous tactile symbol to include tactile features that directly relate to a real-life object illustrated in a corresponding polysemous graphic symbol through the use of a real object, a part of a real object, or manufactured tactile icons with similar tactile characteristics;

forming at least one part of the polysemous tactile symbol to include at least one orthographic character, if the corresponding polysemous graphic symbol includes at least one orthographic element or if the one or more orthographic element helps identify linguistic content associated with the polysemous tactile symbol;

forming at least one part of the polysemous tactile symbol to include an item from established symbology with cultural relevance and conceptual or linguistic associations with vocabulary words and linguistic forms associated with said the corresponding graphic symbol; and forming at least one part of the polysemous tactile symbol to include an abstract tactile element designed based on at least one teachable metaphor or instructional prompt forming an association between the polysemous tactile symbol and the plurality of associated meanings, wherein said polysemous tactile symbol may have little or no direct relationship to an image on the corresponding polysemous graphic symbol but is still associated with the same underlying linguistic meanings.

BRIEF DESCRIPTION OF THE DRAWINGS

Further advantages, features and properties of the present invention are explained below in more detail with the aid of example embodiments and with reference to the accompanying drawings, in which:

FIGS. 4 and 4a illustrate an example system of an embodiment of the present application;

DETAILED DESCRIPTION OF THE EXAMPLE EMBODIMENTS

Figure 1:
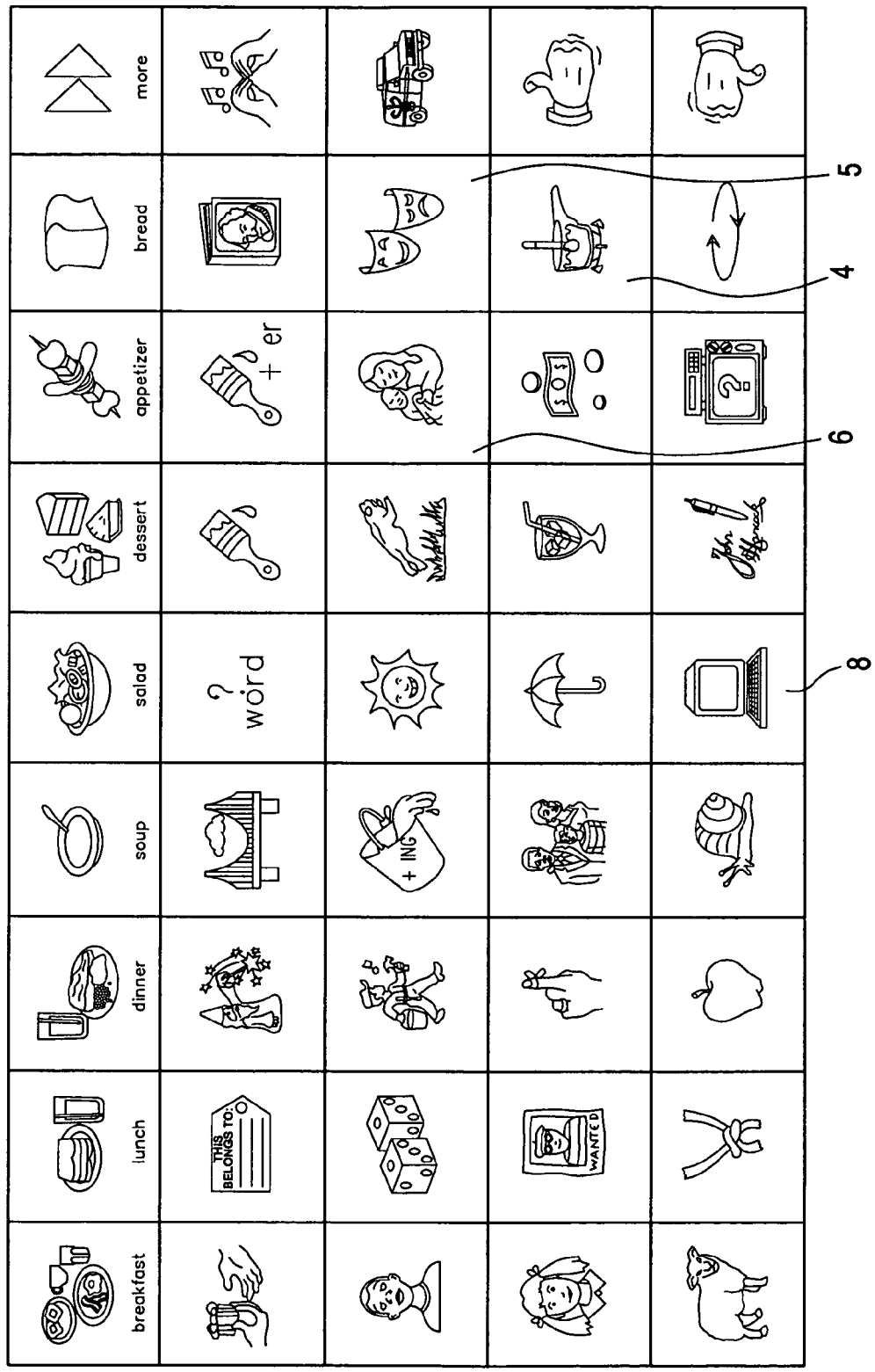
FIG. 1 illustrates an example keyboard key location map with polysemous graphic symbols.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In an embodiment of the present application, a direct access system and/or method is provided, for an operator with vision impairment or without sight, which utilizes sequenceable polysemous tactile symbols to allow access to core vocabulary words, phones and phrases and, in at least one embodiment, provides a system and/or in which modalities are accessible to an operator who is vision impaired or who is without sight to allow these operators to utilize non-polysemous symbols to access fringe vocabulary words, phonemes and phrases.

Still further, an embodiment of the system and/or method of the present application extends uses of the known polysemous graphic symbol systems to operators who are with impaired sight or without sight by creating a polysemous tactile symbol set that directly maps to the established linguistic encoding strategy originally designed for use with a polysemous graphic symbol system, and/or in at least one embodiment, by adding dynamically redefined auditory feedback to enhance access to dynamically redefined non-polysemous symbols, effectively translating the linguistic encoding strategy from a visually represented modality to a tactually represented modality with some dynamically redefined auditory feedback.

In an embodiment of the present application, the tactile symbol system and/or method represents language, more specifically a sequenced polysemous (many-meaning) symbol system in which many of the keyboard key location tactile symbols are polysemous and correspond to a plurality of meanings. The polysemous nature of the symbols allows them to be combined with many other of the symbols in many ways, to then provide access to words, phones, or sentences corresponding to different sequences of symbols. The tactile symbols may be advantageous for users who may not see visually represented symbols due to visual impairment or blindness. The tactile symbols may include three-dimensional characteristics. The three-dimensional characteristics of each symbol may provide distinctive or otherwise meaningful distinctive tactile (such as haptic, for example) feedback to the user, allowing each symbol to be tactually discriminatable from all others in the symbol set and/or allowing symbols to be differentiated by such tactile characteristics alone.

In an embodiment of the present application, a method is provided, comprising: providing a keyboard, including a plurality of keys, at least some of the keys including polysemous symbols which provide distinctive tactile feedback to a user; and accessing a word, phoneme or plural word message, based upon sequentially selected ones of the polysemous symbols providing distinctive tactile feedback. Further, in an embodiment the method includes at least one of storing polysemous symbol sequences in association with a word, phoneme or plural word message; and/or outputting the accessed word, phoneme or plural word message.

Further, in an embodiment of the present application, a system is provided, comprising: a keyboard, including a plurality of keys, at least some of the keys including polysemous symbols which provide distinctive tactile feedback to a user; and a processor to access a word, phoneme or plural word message, based upon sequentially selected ones of the polysemous symbols providing distinctive tactile feedback. Further, in an embodiment the system includes a memory to store polysemous symbol sequences in association with a word, phoneme or plural word message; and/or an output device to output the accessed word, phoneme or plural word message.

Polysemous symbol systems feature an array of graphic symbols, each of which are associated with a wide range of linguistic concepts. An example of a keyboard key location map of such a system of polysemous graphic symbols is shown in FIG. 1. The logical association between a polysemous graphic symbol and a linguistic concept may not be immediately obvious to an inexperienced user. However, a rationale or metaphor may be used as an instructional tool to help the user establish rich and easily remembered associations between the polysemous graphic symbol and each of the underlying linguistic concepts it is associated with. The underlying linguistic organization of known polysemous symbol systems has been successfully used by many people with severe speech and motor impairments; extending this same language encoding system to users with impaired vision or blindness will allow them to use the same language strategies. As such, users can rely upon the polysemous nature of the symbols to, based upon the underlying rational or metaphors associated with the various polysemous symbols, sequence symbols together, wherein sequenced symbols provide access to stored words, phonemes or phrases or even sentences. Due to the polysemous nature of the symbols, each symbol may be sequenced with many other symbols to provide many symbol sequences useable to access many stored words, phonemes or phrases or even sentences.

The inventors have discovered that there is a need for non-graphic symbols for users with impaired vision or blindness, and have even further discovered that such a need can be fulfilled by creating polysemous tactile symbols to allow access to core vocabulary words, phonemes, phrases and even sentences and, have still further discovered that some of the known polysemous graphic symbols (hereinafter designated by use of a (g) after the name of the symbol) cannot be feasibly produced in a tactile form that extends the use of the same teachable metaphors. For example, if a pot of boiling water is used to access words related to cooking, because boiling water is used to cook many foods, simply "changing fonts" of the graphic COOK(g) symbol and using real boiling water as a tactile symbol would be immediately harmful to the user.

Figure 2:
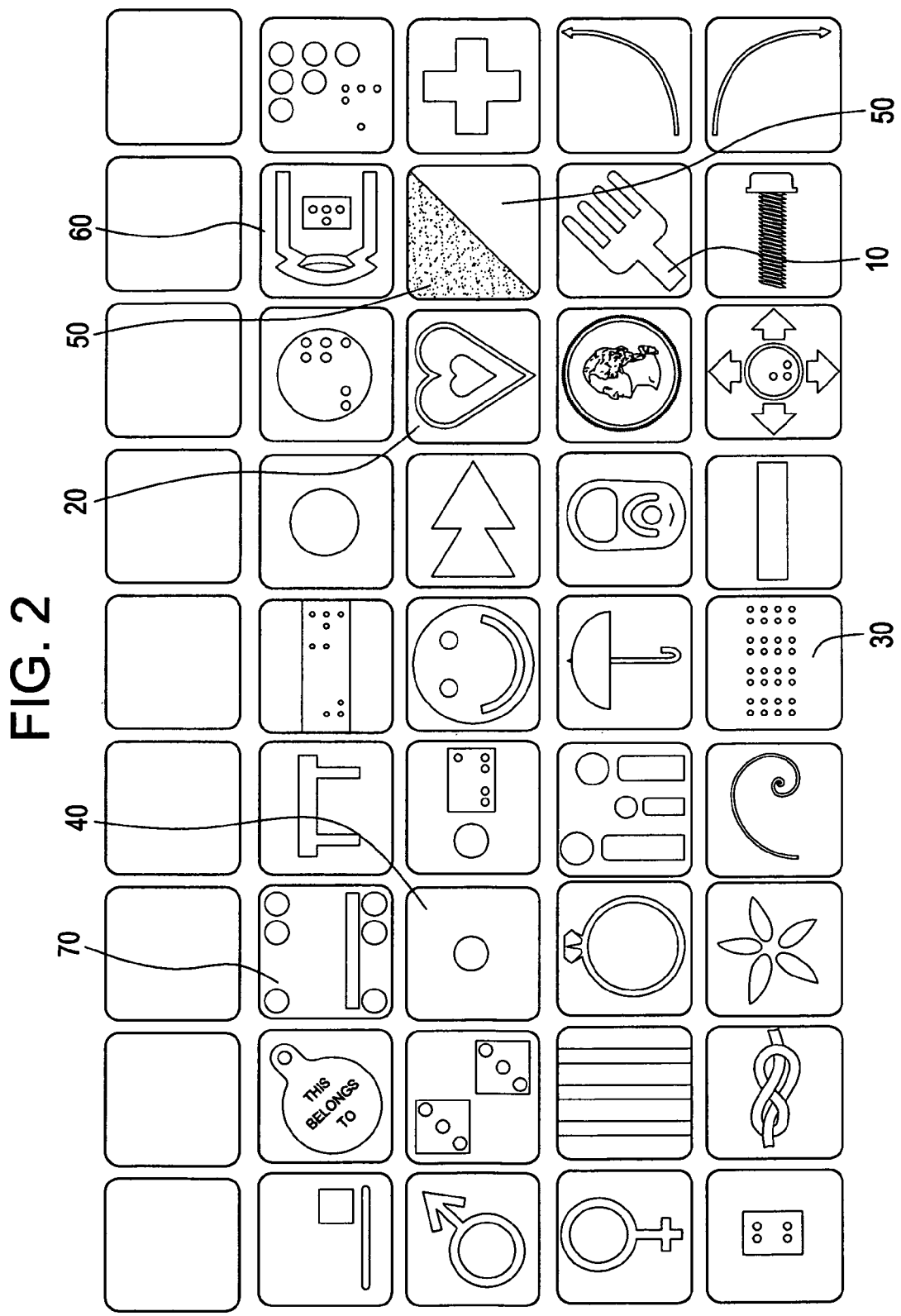
FIG. 2 illustrates a keyboard key location map of an embodiment of the present application, with example tactile symbols corresponding to the polysemous graphic symbols of FIG. 1.

For this reason, novel tactile symbols (hereinafter designated by use of a (t) after the name of the symbol) are hereby developed within an embodiment of the present application, that can be associated with the same underlying meanings and that can safely be used within the space constraints of the system, wherein new teachable metaphors are further developed when needed. An example embodiment of a keyboard key location map of an embodiment of the present application, including example tactile symbols corresponding to the polysemous graphic symbols of FIG. 1, is shown in FIG. 2. Symbol systems such as that of the keyboard key location map of FIG. 1, feature an array of polysemous graphic symbols, wherein each of the polysemous graphic symbols are associated with a wide range of linguistic concepts. In example embodiment of a keyboard key location map of an embodiment of the present application as shown in FIG. 2, including example tactile symbols corresponding to the polysemous graphic symbols of FIG. 1, much of the underlying meaning of the symbols, symbol combinations and metaphors is maintained. For example, the tactile shape of a fork on the tactile symbol COOK(t) 10 of FIG. 2 may be used to replace the graphic symbol BOILING WATER(g) 4 of FIG. 1 in an embodiment of the present application, and can then be used, when sequenced with other symbols, to access the same words or phrases as the graphic symbol BOILING WATER (g) 4, related to cooking, as a fork is commonly used as a cooking tool. As such, in an embodiment of the present application, a system and/or method is developed including a keyboard, including a plurality of keys, at least some of the keys including polysemous symbols which provide distinctive tactile feedback to a user; and a processor to access a word, phoneme or plural word message, based upon sequentially selected ones of the polysemous symbols providing distinctive tactile feedback.

Several example polysemous tactile symbols of an embodiment of the present application are shown in FIG. 2 and are described in this application, including but not limited to a COOK(t) symbol 10 (which may be characteristically shaped like a fork for example); a LOVE(t) symbol 20 (which may be characteristically shaped like a large heart with a small heart inside it for example); a COMPUTER(t) symbol 30 (which may characteristically use the existing symbology of eight-dot Braille for example); a VERB(t) symbol 40 (which may be characterized by a ball bearing that can be moved with a finger tip for example); a MASKS(t) symbol 50 (which may be characterized by the use of smooth and rough textures on the same symbol); and others.

These polysemous tactile symbols of FIG. 2 for example, and others, may each be characterized by meaningful distinctive three-dimensional and tactile characteristics that provide distinctive tactile feedback to the user, allowing each symbol to be tactually discriminatable from all others in the symbol set and/or allowing symbols to be differentiated by such tactile characteristics alone. Each polysemous tactile symbol can be used as a replacement for a polysemous graphic symbol on a known polysemous symbol sequencing system, and may be associated with the same plurality of linguistic concepts as corresponding polysemous graphic symbol. When a plurality of polysemous graphic symbols with underlying content stored within an organizational structure of symbol sequences are replaced with a plurality polysemous corresponding tactile symbols, pre-stored linguistic content can be selected by actuating sequences of polysemous tactile symbols using the same organizational structure. As such, in an embodiment of the present application, a method and/or a system is provided, including providing a keyboard, including a plurality of keys, at least some of the keys including polysemous symbols which provide distinctive tactile feedback to a user; and accessing a word, phoneme or plural word message, based upon sequentially selected ones of the polysemous symbols providing distinctive tactile feedback.

In an embodiment of the present application, the polysemous tactile symbol system and/or method described above is used with a synthetic speech or typing device, which stores and retrieves whole sentences or plural word messages upon selection of sequenced symbols. In an embodiment of the present application, the method and/or system is provided for directly translating a linguistic encoding strategy with stored content (such as words, phonemes, or plural word messages for example) represented by sequenced polysemous graphic symbols (two or more) with two dimensions to a linguistic encoding strategy represented by sequenced polysemous tactile symbols with three dimensions.

In an embodiment of the present application, the method and/or system is provided for translating a linguistic encoding strategy with stored content (such as words, phonemes, or plural word messages for example) represented by sequenced graphic symbols (two or more) to a linguistic encoding strategy with stored content (such as words, phonemes, or plural word messages for example) represented by sequenced tactile symbols (two or more) by changing the surface-level symbolic representation without changing the underlying language content or organization. In this embodiment, a polysemous graphic symbol (such as one from FIG. 1 for example) from a known polysemous symbol sequence that is already associated with a plurality of stored sentences, words, phonemes, or messages can be replaced by a polysemous tactile symbol (such as one from FIG. 2 for example) that can be associated with a corresponding tactile symbol sequence to access the same plurality of stored sentences, words, phonemes, or messages.

For example, the existing graphic symbol LOVE(g) 6 of FIG. 1, features an image of a mother holding a baby, and may be associated with the words love, kiss, hug, young, tiny, because, tell, with, baby, accept, and reject for example, and may be used to access such words when sequenced with one or more of the other polysemous symbols of FIG. 1. For example, selecting the LOVE(g) symbol, followed by the VERB(g) symbol may produce a symbol sequence that the processor 104 can then compare to the sequences in memory 106, to access the verb "love." Selecting the LOVE(g) symbol, followed by the SUN(g) symbol and the VERB(g) symbol may produce a symbol sequence that the processor 104 can then compare to the sequences in memory 106, to access the verb "kiss." Selecting the PREP(g) symbol, followed by the LOVE(g) symbol may produce a symbol sequence that the processor 104 can then compare to the sequences in memory 106, to access the preposition "with." Selecting the LOVE(g) symbol twice, followed by the VERB(g) symbol may produce a symbol sequence that the processor 104 can then compare to the sequences in memory 106, to access the verb "hug."

In an embodiment of the present application, the novel polysemous tactile symbol LOVE(t) 20 of FIG. 2 features an embossed outline of a large heart with a smaller embossed heart inside it, for example, and may be used in one embodiment of the present application in of the same manner as the LOVE(g) symbol of FIG. 1, and thus similarly may be associated with the words love, kiss, hug, young, tiny, because, tell, with, baby, accept, and reject for example, and may similarly be used to access such words when sequenced with one or more of the other tactile polysemous symbols of FIG. 2. For example, selecting the LOVE(t) symbol, followed by the VERB(t) symbol may produce a symbol sequence that the processor 104 can then compare to the sequences in memory 106, to access the verb "love." Selecting the LOVE(t) symbol, followed by the SUN(t) symbol and the VERB(t) symbol may produce a symbol sequence that the processor 104 can then compare to the sequences in memory 106, to access the verb "kiss." Selecting the PREP(t) symbol followed by the LOVE (t) symbol may produce a symbol sequence that the processor 104 can then compare to the sequences in memory 106, to access the preposition "with." Selecting the LOVE(t) symbol twice, followed by the VERB(t) symbol may produce a symbol sequence that the processor 104 can then compare to the sequences in memory 106, to access the verb "hug."

Thus, the surface-level symbolic representation of a mother holding a child may be replaced with a surface-level representation of hearts, for example, in the tactile keyboard key location map of FIG. 2. As such, the plurality of underlying words associated with the original LOVE(g) symbol 6 may be unchanged And the new LOVE(t) symbol 20 of an embodiment of the present application shown in FIG. 2 may thus similarly have a rich association with the same plurality of underlying accessible words.

Accordingly, an embodiment of the present application is directed to a method for translating representational characteristics of a polysemous graphic symbol into a tactile format. The method includes:

determining a plurality of stored words, phonemes, messages or sentences associated with a polysemous graphic symbol of a system, the plurality of stored words, phonemes, messages or sentences being respectively accessible by actuation of the polysemous graphic symbol in sequence with respective other polysemous graphic symbols;

identifying associations between the polysemous graphic symbol and the plurality of determined stored words, phonemes, messages or sentences; and translating representational characteristics of the polysemous graphic symbol into tactile format of a tactile polysemous symbol to be associated with the determined plurality of stored words, phonemes, messages or sentences, wherein tactile characteristics of the tactile polysemous symbol relate to the identified associations.

Still further, the method may include positioning the developed tactile polysemous symbol on a key of a keyboard associated with the polysemous graphic symbol, effectively replacing the polysemous graphic symbol with the polysemous tactile symbol to access respective ones of the determined plurality of stored words, phonemes, messages or sentences when sequenced with respective other tactile polysemous symbols. In an embodiment of the method, the identified associations include teachable metaphors and/or the identified associations include associations with a plurality of linguistic concepts relating to the stored words, phonemes, messages or sentences and the polysemous graphic symbol. Further, in another embodiment, the teachable metaphors are useable to explain associations between the polysemous graphic symbol and underlying linguistic concepts.

In an embodiment of the present application, a method and/or system is provided for establishing rich associations between a plurality of linguistic concepts and a novel polysemous tactile symbol through utilization of teachable metaphors. The polysemous graphic symbols of FIG. 1 already have rich associations with a plurality of linguistic concepts that can be selected using a polysemous graphic symbol; known teachable metaphors may be used to explain the association between the known polysemous graphic symbols and underlying linguistic concepts to a user. The known polysemous graphic symbol may then be replaced in an embodiment of the present application by the novel polysemous tactile symbols of the present application that may be associated with the same plurality of linguistic concepts. Known teachable metaphors are preserved when possible, but these metaphors may also be replaced if there is no logical relationship between the tactile symbol and the existing metaphor.

In one example embodiment, a polysemous graphic symbol COMPUTER(g) 10 is associated with the category of words related to computer technologies because those words are associated with the image of a computer. Once the user establishes the concept that the polysemous tactile symbol eight-dot Braille(t) 30 may be used for computer applications, the same teachable metaphors used to explain the COMPUTER(g) symbol can then be used in an embodiment of the present application to create associations between the COMPUTER(t) symbol and other symbols for sequencing, to access the underlying language content.

In another example, the polysemous graphic symbol LOVE(g) 6 described above is associated with the word love because the image demonstrates that the mother loves her baby. The LOVE(g) symbol 6 is also associated with the word hug because the mother is hugging her child. Neither of these metaphors may be applicable to the polysemous tactile symbol LOVE(t) 20 of an embodiment of the present application. Therefore, new metaphors may used instead in an embodiment of the present application; the polysemous tactile LOVE (t) symbol 20 may be associated with the word love because the heart is for someone you love; the polysemous tactile LOVE(t) symbol 20 may be associated with the word hug because the big heart is hugging the little heart, etc.

Other non-limiting examples and non-limiting example comparisons between tactile and graphic symbols are as follows:

| Graphic Symbol LOVE(g) | Associated Word | Symbol Sequence | Rationale/ Metaphor For Mapping Word to Graphic Symbol Sequence | Tactile Symbol LOVE(t) | Can original rationale/ metaphor be preserved? | Rationale/ Metaphor For Mapping Word to Tactile Symbol Sequence |
|---|---|---|---|---|---|---|
| As shown in column 3, row 7 (element 6) of FIG. 1 | Love | LOVE VERB | The mother loves her baby | As shown in column 3, row 7 (element 20) of FIG. 2 | NO | This is a heart for someone you love |
| | Kiss | LOVE SUN VERB | A kiss often makes you feel happy | | YES, based on the SUN(t) symbol | A kiss often makes you feel happy. |
| | Hug | LOVE LOVE VERB | The mother is hugging her child | | NO | The big heart is hugging the little heart. |
| | Young | LOVE LOVE ADJ | A young baby is seen in the LOVE icon | | NO | A person can be "young at heart" |
| | Tiny | DICE LOVE ADJ | The baby is tiny | | NO | The little heart is tiny, or the baby heart is tiny |
| | Because | CONJ LOVE | The mother is holding the baby because it is crying | | NO | You give somebody your heart because you love them. |
| | With | PREP LOVE | The LOVE icon shows the mother with the baby. | | NO | The LOVE icon shows a big heart with a little heart inside it. |
| | Baby | PEOPLE LOVE NOUN | A baby is shown on the LOVE icon | | NO | The big heart is going to have a little baby heart |
| | Accept | LOVE THUMBS UP | LOVE = love related words: THUMBS UP = positive; hence ACCEPT | | YES | LOVE = love related words: THUMBS UP = positive; hence ACCEPT |
| | Reject | LOVE THUMBS DOWN | LOVE = love related words: THUMBS DOWN = negative; hence REJECT | | YES | LOVE = love related words: THUMBS DOWN = negative; hence REJECT |

| Graphic Symbol COMPUTER(g) | Associated Word | Symbol Sequence | Rationale/ Metaphor For Mapping Word to Graphic Symbol Sequence | Tactile Symbol COMPUTER(t) | Can original rationale/ metaphor be preserved? | |
|---|---|---|---|---|---|---|
| As shown in column 5, row 5 (element 8) of FIG. 1 | Computer | COMPUTER NOUN | A picture of a computer is shown on the COMPUTER icon. | As shown in column 5, row 5 (element 30) of FIG. 2 | Yes, but only after explaining the cultural significance of eight dot Braille as a distinct Braille code for computer applications. Many computer technologies designed to improve access for people who are blind use an eight-dot Braille system for various functions. These full cells of eight dot Braille give a meaningful or distinctive connection to the field of specially designed computers that are used by people who are blind. | |
| | Internet | COMPUTER MAP NOUN | You use a computer to find things on the internet. | | | |
| | Store | COMPUTER VERB | You store information on your computer. | | | |
| | Instruction | PHONE COMPUTER NOUN | You need to know many instructions to use a computer. | | | |

-continued

| Graphic Symbol APPLE(g) | Associated Word | Symbol Sequence | Rationale/ Metaphor For Mapping Word to Graphic Symbol Sequence | Tactile Symbol APPLE(t) | Can original rationale/ metaphor be preserved? |
|---|---|---|---|---|---|
| As shown in column 5, row 3 of FIG. 1 | Eat | APPLE VERB | You may eat an apple | As shown in column5, row 3 of FIG. 2 | Yes. The star shape on the tactile icon is the pattern of the seed compartments that is found if you cut an apple in half. This hands-on activity can be used to show a child who is blind that this icon represents a tactile feature of an apple. Thus, the symbol can be explained with a metaphor or hands-on examples. |
|  | Hungry | APPLE ADJECTIVE | You can eat an apple when you are hungry |  |  |
|  | Food | APPLE NOUN | An apple is a food |  |  |
|  | Grow | APPLE FAMILY VERB | The children in a family need to eat to grow |  |  |
|  | Sweet | APPLE THUMBS UP ADJ | APPLE = food related: THUMBS UP = positive: ADJ = describing word; hence SWEET |  |  |

| Graphic Symbol JUICE(g) | Associated Word | Symbol Sequence | Rationale/ Metaphor For Mapping Word to Graphic Symbol Sequence | Tactile Symbol CAN(t) | Can original rationale/ metaphor be preserved? | Rationale/ Metaphor For Mapping Word to Tactile Symbol Sequence |
|---|---|---|---|---|---|---|
| As shown in column 4, row 6 of FIG. 1 | He can | HE JUICE | HE = HE: You may drink a can of JUICE; hence HE CAN | As shown in column 4, row 6 of FIG. 2 | Yes, if you replace "JUICE" with "CAN" | HE = HE; The CAN icon shows the top of a pop can; hence HE CAN |
|  | Can he | JUICE HE | You may drink a can of JUICE: HE = HE: hence CAN HE |  |  | The CAN icon shows the top of a pop can: HE = HE; hence CAN HE |
|  | Drink | JUICE VERB | You DRINK JUICE |  |  | You can drink pop or juice out of this type of CAN. |
|  | Swallow | JUICE JUICE VERB | Drinking-related words. SWALLOW your juice |  | YES | Drinking related words. SWALLOW your drink |
|  | Thirsty | JUICE ADJ | You need a drink when you are thirsty |  | YES | You need a drink when you are thirsty. |
|  | Enough | DET JUICE | There is enough juice in the glass |  | NO | I have enough to drink in this can. |
|  | Full | JUICE THUMBS UP ADJ | JUICE = Drinking related words: THUMBS UP = positive; hence FULL |  | Yes, if you replace "JUICE" with "CAN" | CAN = Drinking related words: THUMBS UP = positive; hence FULL |
|  | Empty | JUICE THUMBS DOWN ADJ | JUICE = Drinking related words: THUMBS DOWN = negative; hence EMPTY |  |  | CAN = Drinking related words: THUMBS DOWN = negative; hence EMPTY |

-continued

| Graphic Symbol VERB(g) | Associated Word | Symbol Sequence | Rationale/ Metaphor For Mapping Word to Graphic Symbol Sequence | Tactile Symbol VERB(t) | Can original rationale/ metaphor be preserved? | Rationale/ Metaphor For Mapping Word to Tactile Symbol Sequence |
|---|---|---|---|---|---|---|
| As shown in column 3, line 3 of FIG. 1 | Stem forms of all verbs stored in the language of the system | [1-2 initial symbols] VERB | The "Action Man" in the graphic icon is busy doing many things. Therefore, he is associated with the general concept of actions. Icon sequences ending with the VERB icon always generate the stem form of a verb, or action. | As shown in column 3, line 3 of FIG. 2 | NO | The tactile icon has a ball bearing, which can be moved by touching it with one finger. This conveys a tactile sensation of mechanical action. Hence, the built-in mechanical action is associated with the general concept of actions, or verbs. |

In an embodiment of the present application, a method and/or system of a keyboard key location map of polysemous tactile symbols is disclosed for use in conjunction with a voice synthesizing system and a linguistic encoding system. That previously developed Baker '916 patent system and method for producing synthetic plural word messages stored in memory in response to the actuation of selected keys on a keyboard, with a plurality of keys key bearing a polysemous symbol or icon related, in combination with other icons, to a message to be retrieved, enabled generation of plural word messages or whole sentence messages by the actuation of only a few keys. Further, with a system containing plural word messages having messages related to the respective polysemous symbols or icons on the keyboard, allowed for selective activation of a plurality of messages in combination with the associated icons on the keys. On each key of the previously developed system, the graphic polysemous symbol or icon include alpha numeric characters and pictorial illustrations that are culturally relevant.

The system and/or method of an embodiment of the present application provides a system and/or method for the operator to access a stored word, phoneme or message from a plurality of stored words, phonemes or messages based on meaningful distinctive tactile feedback. This is possible because the central symbol on many keys of the keyboard is a polysemous tactile symbol, such as those shown in FIG. 2 for example. The polysemous tactile symbols of FIG. 2 provide the operator with meaningful distinctive tactile feedback that can be perceived through direct contact with the fingertips or other limb used to make selections on the system such that the operator can accurately discriminate between the plurality of symbols based solely on the unique characteristics of tactile feedback from touching each symbol. Each of the polysemous tactile symbols is developed to be rich in association and, in combination, signal sentence ideas in the memory of the operator.

Therefore, when the keyboard key location map including polysemous tactile symbols such as those shown in FIG. 2 replaces the keyboard key location map including polysemous graphic symbols such as those shown in FIG. 1 for example, embodiments of the present application enhance the symbol sequencing system and method of the previous Baker '916 patent, by aspects including the utilization of a system and/or method of polysemous tactile symbols associated with ones of the plurality of keys, which are differentiated by sense of touch for example.

An embodiment of the present application therefore provides a system and/or method of polysemous tactile symbols as mentioned above, wherein the tactile symbols can be used in conjunction with an existing linguistic encoding system described above without requiring modification of the previously established organizational structure of the associated language content. This may be accomplished through a process of translating the representational characteristics of the existing graphic symbol system into a tactile format using a translation process comprising:

(a) determining a full plurality of stored words, phones, sentences or messages associated with an existing polysemous graphic symbol on the existing Baker '916 patent or Baker '303 patent system for example, that can be accessed by actuation of the polysemous graphic symbol in sequence with other polysemous graphic symbols;

(b) identifying any teachable metaphors and other instructional prompts that are used to teach users to recognize associations between the existing graphic symbol reviewed in (a) and the plurality of stored words, phones, sentences or messages associated with the symbol as identified in (a);

(c) developing a specification for a new tactile polysemous symbol (such as those shown in FIG. 2 for example) that an operator can easily learn to associate with the plurality of stored words, phones, sentences or messages identified in (a), wherein the specification includes at least an account of tactile characteristics of the symbol and teachable metaphors and instructional prompts that can be utilized to help support the learning of an operator. Teachable metaphors and instructional prompts identified in (b) should be preserved as much as possible; and/or (d) developing the tactile polysemous symbol specified in (c), such that it is positioned on a key that activates the full plurality of stored words, phones, sentences or messages associated with the existing graphic symbol identified in (a) when actuated, effectively replacing the polysemous graphic symbol with a polysemous tactile symbol with no modification of the underlying language content.

Another embodiment of the present application provides a hierarchical approach to the selection of objects for use as polysemous tactile symbols that maximizes the carryover of teachable metaphors and other instructional prompts used with an existing polysemous graphic symbol to applications involving a corresponding polysemous tactile symbol, comprising:

(a) when possible, at least one part of a polysemous tactile symbol includes tactile features that directly relate to a real-life object illustrated in the corresponding polysemous graphic symbol through the use of a real object, a part of a real object, or manufactured tactile icons with similar tactile characteristics;

(b) at least one part of a polysemous tactile symbol may include orthographic characters, for example Braille or embossed alpha characters, if the corresponding polysemous graphic symbol includes at least one orthographic element, or if the one or more orthographic element helps identify the linguistic content associated with the particular polysemous tactile symbol;

(c) if (a) and (b) are not sufficient, at least one part of a polysemous tactile symbol may include an item from established symbology with cultural relevance and rich conceptual or linguistic associations with vocabulary words and linguistic forms associated with said existing graphic symbol;

(d) if (a), (b), and (c) are not sufficient, at least one part of a polysemous tactile symbol may include an abstract tactile element designed based on at least one teachable metaphor or instructional prompt that can help an operator establish an association between the polysemous tactile symbol and the plurality of associated meanings; wherein said polysemous tactile symbol may have little or no direct relationship to the image on the corresponding polysemous graphic symbol but is still associated with the same underlying linguistic meanings; and/or (e) a plurality of the above tactile symbol elements in (a), (b), (c), and (d), and other elements may be used in any combination to produce a complex polysemous tactile symbol, hence (a), (b), (c), and (d) are not mutually exclusive.

Thus, a further embodiment of the present application is directed to a method of forming a polysemous tactile symbol from representational characteristics of a corresponding polysemous graphic symbol, the method comprising at least one of:

forming at least one part of the polysemous tactile symbol to include tactile features that directly relate to a real-life object illustrated in a corresponding polysemous graphic symbol through the use of a real object, a part of a real object, or manufactured tactile icons with similar tactile characteristics;

forming at least one part of the polysemous tactile symbol to include at least one orthographic character, if the corresponding polysemous graphic symbol includes at least one orthographic element or if the one or more orthographic element helps identify linguistic content associated with the polysemous tactile symbol;

forming at least one part of the polysemous tactile symbol to include an item from established symbology with cultural relevance and conceptual or linguistic associations with vocabulary words and linguistic forms associated with said the corresponding graphic symbol; and forming at least one part of the polysemous tactile symbol to include an abstract tactile element designed based on at least one teachable metaphor or instructional prompt forming an association between the polysemous tactile symbol and the plurality of associated meanings, wherein said polysemous tactile symbol may have little or no direct relationship to an image on the corresponding polysemous graphic symbol but is still associated with the same underlying linguistic meanings.

In an alternative embodiment of the present application, at least one of the graphic symbols translated into a tactile symbol using at least one of the above-mentioned methods may be non-polysemous.

In an embodiment of the present application, in at least one embodiment of a system and/or method of polysemous tactile symbols as mentioned above, at least one polysemous tactile symbol may be at least partly comprised of a real object. Further, in an embodiment of the present application, in at least one embodiment of a system and/or method of polysemous tactile symbols as mentioned above, at least one polysemous tactile symbol may be at least partly comprised of a tactile graphic with an engraved or embossed surface. Still further, in an embodiment of the present application, in at least one embodiment of a system and/or method of polysemous tactile symbols as mentioned above, at least one polysemous tactile symbol may be at least partly comprised of Braille or alpha numeric characters.

In an embodiment of the present application, in at least one embodiment of a system and/or method of polysemous tactile symbols as mentioned above, at least one polysemous tactile symbol may be at least partly composed of an element from established symbology. For example, Blissymbolics® may be used if permission is obtained from the owners of the Blissymbolics® system.

In an embodiment of the present application, in at least one embodiment of a system and/or method of polysemous tactile symbols as mentioned above, at least one of the plurality of polysemous tactile symbols may be at least partly comprised of physical objects with at least one moving part such that the movement of the at least one moving part of the object is used as meaningful distinctive tactile feedback to a user, allowing each symbol to be tactually discriminatable from all others in the symbol set and/or allowing symbols to be differentiated by such tactile characteristics alone. For example, the Verb symbol has a ball bearing (polysemous tactile symbol 40 of FIG. 2 for example) that can be moved with a fingertip: the sensation of mechanical action is associated with verbs, which are action words.

In an embodiment of the present application, in at least one embodiment of a system and/or method of polysemous tactile symbols as mentioned above, at least one of the plurality of polysemous tactile symbols may be at least partly comprised of electrically activated vibratory or haptic feedback. For example, a refreshable pin may be incorporated into the design of a more complex symbol to give dynamically redefined tactile feedback. The refreshable pin may be raised so that it is felt, lowered so that it is not felt, or it may oscillate so it is felt temporarily, or vibrate.

In an embodiment of the present application, in at least one embodiment of a system and/or method of polysemous tactile symbols as mentioned above, the shape of a symbol may be used to provide meaningful distinctive tactile feedback to a user, allowing each symbol to be tactually discriminatable from all others in the symbol set and/or allowing symbols to be differentiated by such tactile characteristics alone. For example, the graphic symbol LOVE(g) 6 on existing sequenced polysemous symbol systems is a picture of a mother holding a baby wrapped in a blanket. The corresponding tactile symbol LOVE(t) 20 of an embodiment of the present application may be represented by a large embossed heart shape with a smaller embossed heart shape inside it, which is suggestive of a baby inside his/her pregnant mother. The heart shapes may be associated with linguistic content that was previously associated with the picture of the mother and child. The heart shapes are distinct from the fork shape described previously for the tactile COOK(t) symbol 10 of an embodiment of the present application.

In an embodiment of the present application, in at least one embodiment of a system and/or method of polysemous tactile symbols as mentioned above, the topography of a symbol may be used to provide meaningful distinctive tactile feedback to a user, allowing each symbol to be tactually discriminatable from all others in the symbol set and/or allowing symbols to be differentiated by such tactile characteristics alone. An engraved symbol, in an embodiment of the present application for example, may have some areas with deeper engraving, some areas with shallow engraving, and other areas with no engraving at all, creating a tactile symbol with multiple topographical layers. For example, the tactile BOOK(t) symbol 60 may use multiple topographic levels to represent the corner of a hard bound book, including cover, spine, and pages for example.

In an embodiment of the present application, in at least one embodiment of a system and/or method of polysemous tactile symbols as mentioned above, the texture of a symbol may be used as meaningful distinctive tactile feedback to a user, allowing each symbol to be tactually discriminatable from all others in the symbol set and/or allowing symbols to be differentiated by such tactile characteristics alone. For example, the graphic MASKS(g) symbol 5 on existing sequenced polysemous symbol systems shows a happy face and a sad face, and is associated with words related to the full spectrum of feelings and emotions. The corresponding tactile MASKS(t) symbol 50 in an embodiment of the present application, may have a smooth texture on one side and a rough sandpaper texture on the opposite side for example, using texture to represent diverse feelings in a tactile form.

In an embodiment of the present application, in at least one embodiment of a system and/or method of polysemous tactile symbols as mentioned above, color and other visual characteristics may be used to provide meaningful distinctive feedback to a user and/or to operators with some vision and their communication partners, allowing each symbol to be tactually discriminatable from all others in the symbol set and/or allowing symbols to be differentiated by such tactile characteristics alone. In many individuals, some degree of color perception is preserved after most other visual skills are lost. High contrast colors within a symbol may provide visual cues to both the user and communication partner. For example, in an embodiment of the present application, the tactile MORE(t) symbol 70 may have raised black dots set against a matte yellow background, a contrast that may be perceived by some people with minimal vision.

In an embodiment of the present application, a unique new user interface system is created which is more accessible to users who are blind or visually impaired. In an embodiment of the present application, one approach may be to use keys of different "feels." One key/symbol might be deep Velcro®, the next shallow, stiff Velcro®. Other keys may have different tactile qualities unrelated to the pictures they refer to. The reason such an approach would not work well with other symbol sets, is that other symbol sets depend upon how a given drawing relates to the meaning of the proposed symbol. Learning to recognize pictures is very difficult. Even raised letters are difficult for the finger to recognize. A raised graphic of various emotion faces would be beyond the best finger.

Add to this, the AAC population typically has generalized voluntary motor issues precluding the careful fingering of a picture. As such, in an embodiment of the present application, only sequenced multi-meaning icons could use his method to produce spontaneous utterances. Other pictorial systems have hundreds and hundreds of pictures on different pages. These systems usually depend on touch screens which do not permit tactility, except for vibrations. Having 500 pictures with 500 different vibrations distributed over 20 virtual pages invisible to the user is impractical.

Figure 3:
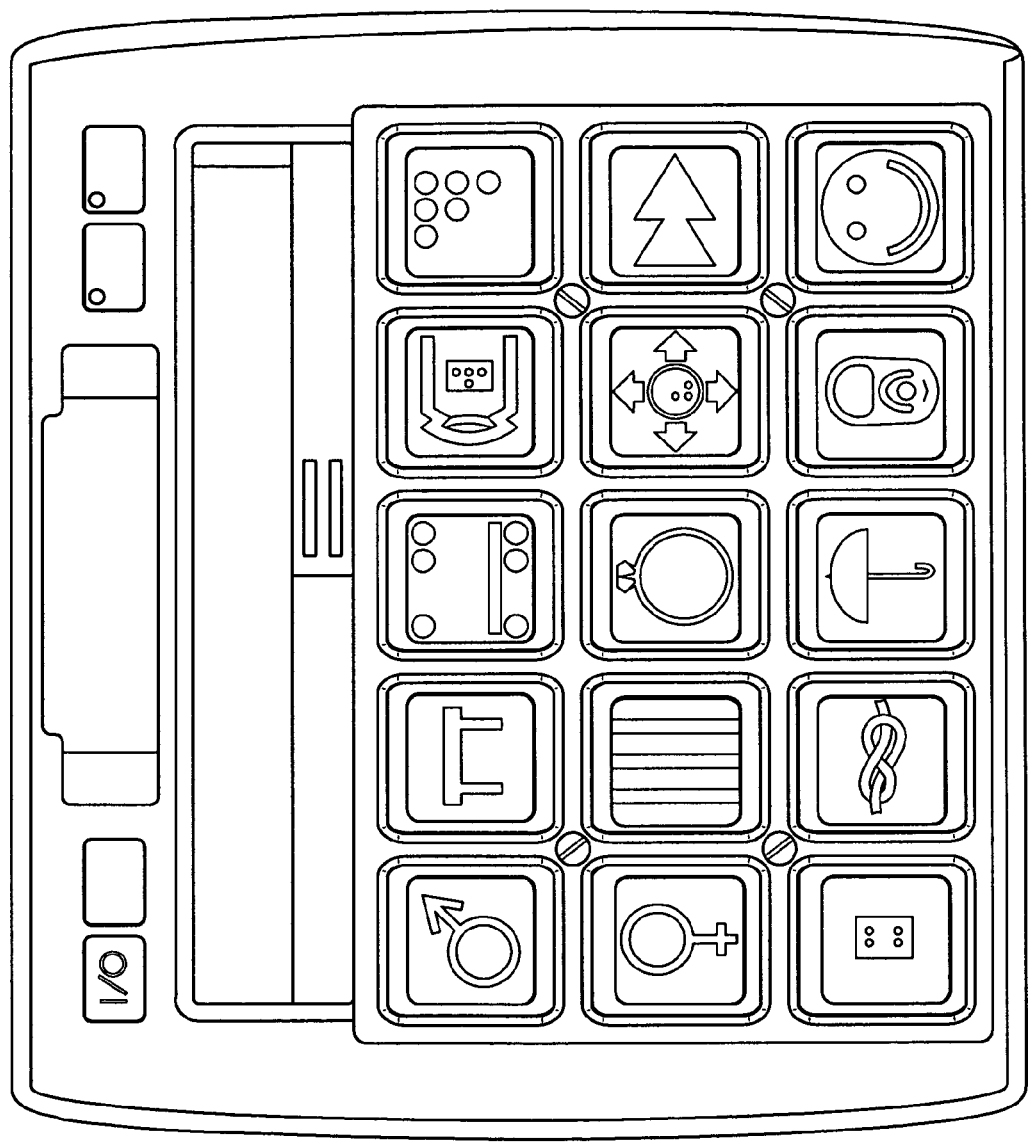
FIG. 3 illustrates a 15-location Tactile Overlay of an embodiment of the present application.

In an embodiment of the present application, a Tactile Overlay such as that shown in FIG. 3 may be developed (noting that the 15 tactile symbol overlay is merely an example, as the overlay could similarly be 45 symbol overlay of FIG. 2, or any other overlay with any other number of symbols), an optional hardware component that can support tactile language representation and make the language content of the Baker '916 patent, Baker '303 patent and/or the Kushler '041 patent more accessible to users who are visually impaired or even blind. These Tactile Overlays will help make AAC language accessible to users with visual impairments, including those who are nonverbal-blind and Deaf-blind. With this adaptation, more advanced communication systems may be provided for a clinical population that is typically not prescribed speech generating devices because the visual language representation systems involved are not accessible.

With this in mind, an embodiment of the present application may be directed to a user interface that supports tactile language representation and is more consistent with clinical practice for users with visual impairments. In an embodiment, a 15-location Tactile Overlay such as that shown in FIG. 3 may include a hardware keyboard that attaches to a system disclosed in, for example, the Baker '916 patent, Baker '303 patent and/or the Kushler '041 patent in place of a keyguard, can support tactile language representation, and supports direct selection of all language content in any 15-location user area. It works most effectively as a static display system because all of the symbols are physical manipulatives instead of graphic icons. A vocabulary set using this prototype may be ideal for an early AAC user.

Further, in an embodiment of the present application, a system is provided, comprising: a keyboard, including a plurality of keys, at least some of the keys including polysemous symbols which provide distinctive tactile feedback to a user; and a processor to access a word, phoneme or plural word message, based upon sequentially selected ones of the polysemous symbols providing distinctive tactile feedback. Further, in an embodiment the system includes a memory to store polysemous symbol sequences in association with a word, phoneme or plural word message; and/or an output device to output the accessed word, phoneme or plural word message.

Figure 4:
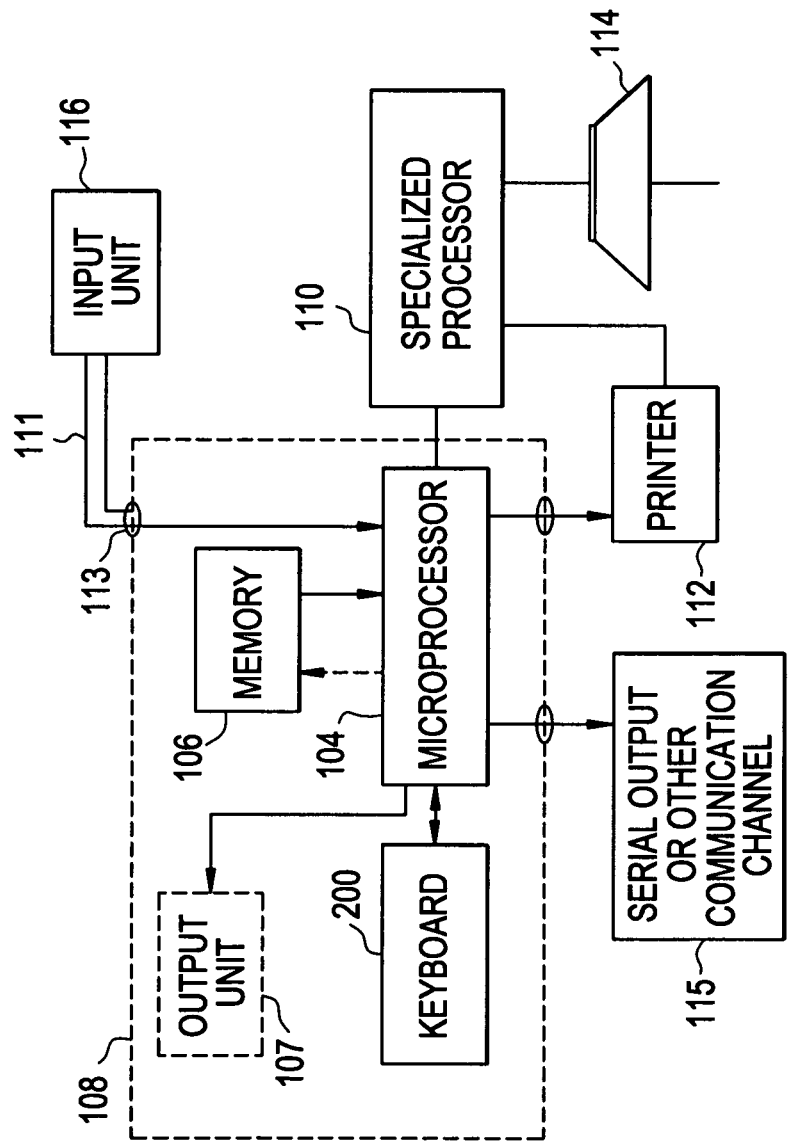

Referring to FIGS. 4 and 4a, there is illustrated an example system of an embodiment of the present application generally designated by 108, for implementing the tactile overlay keyboard of FIG. 2 and/or FIG. 3 (as part of keyboard 200 for example), for example in a speech synthesis system. The system 108 is shown in conjunction with a specialized processor 110 and output unit 107, printer 112, communication channel 115, audio circuits 118 and 119 with speakers 114 and 121 for example. Alternatively, circuit 119 and speaker 121 may be omitted, with audio output routed through circuit 118 to speaker 114 for example. The apparatus 108 may generate input for the specialized processor 110 based on accessing information (e.g. at least one word, phoneme, phrase, sentence) associated with or corresponding to tactile polysemous symbol sequences associated with keys on the keyboard 200 implementing the tactile overlay keyboard of FIG. 2 and/or FIG. 3, for output to the output unit 107 (for display in a word processing mode for example). The system 108 of at least one embodiment of the present application may include a display as the output unit 107 to display the output of the at least one word, phoneme, phrase, sentence associated with the sequence of selected tactile symbols and/or may include a speaker 114 (in a speech processing mode for example) to audibly output the at least one word, phoneme, phrase, sentence associated with the sequence of selected tactile symbols.

The system 108 of an embodiment of the present application may generate input for the specialized processor 110 based on accessing information corresponding to polysemous tactile symbols of sequentially selected keys of the keyboard 200 implementing the tactile overlay keyboard of FIG. 2 and/or FIG. 3, for example. Alternatively, the specialized processor 110 may be omitted, and the system 108 may output processed information to a printer 112, output unit 107, communication channel 115, etc. Any and all of the output channels of apparatus 8 may be selected to output a given word, phoneme, phrase, sentence associated with the sequence of selected tactile symbols.

It should be noted that if the output unit 107 includes a display, the keyboard 200 implementing the tactile overlay keyboard of FIG. 2 and/or FIG. 3, for example, and the display may be integrated. Further, the keyboard 200 implementing the tactile overlay keyboard of FIG. 2 and/or FIG. 3, for example, may be a virtual keyboard, and again may be integrated with a display.

The addition of auditory scanning capabilities to the system 108, in at least one embodiment, may include that the specialized processor 110 includes a microprocessor controlled speech synthesizer, to synthesize speech for example. The synthesizer should be a high quality synthesizer that is easily understood by the user. Anything less will make the system difficult to learn and use in other than optimal conditions. To maximize the effectiveness of the system, provisions need to be made in the hardware to allow the microprocessor 104 to route the audio signal output from the specialized processor 110 either to the user or the conversation partner. If both the system prompts and user generated speech are sent to the external speaker 114, the conversation partner will have system prompts intended for the user's access requirements.

Thus, in at least one embodiment, a speech synthesis system may include the system 108, as well as a speech synthesizer to synthesize the output word, phoneme, phrase, sentence associated with the sequence of selected tactile symbols.

The example implementation of auditory scanning is shown and described regarding FIG. 4a and uses an analog switch 117 to route the output from the speech synthesizer to either the standard audio output circuit 118 to speak to a listener through speaker 114, or to route the audio to the prompt audio output circuit 119 to inform the user of the present state of the apparatus through an earphone or private speaker 121. An earphone detection circuit 120 may also be included in this example. The system 108 can detect if the earphone becomes disconnected and route the auditory scanning prompts to the main speaker if needed to keep the system functional.

As stated above, the system 108 may include an output unit 107. This output unit 107 can be one of a processor and speaker to generate audible sound waves, light source matrix with individually controlled lights, or any similar type output device or combination of devices which can be utilized in conjunction with one of a plurality of different input units 116. The input unit 116 may be one or more of a plurality of input devices (such as those described in U.S. Pat. No. 5,297,041 issued Mar. 22, 1994 to Kushler et. al., the entire contents of which are hereby incorporated herein by reference) which is utilized in conjunction with the output device 107 and the microprocessor 104 to activate signals corresponding to the plurality of keys on the keyboard implementing the tactile overlay keyboard of FIG. 2 and/or FIG. 3, for example, and thus indicate selection of a particular key. Further, this input device 116 can be connected to the microprocessor 104 through a cable 111 which is attached to an input port 113 of the system 108. Thus, a plurality of various input units 116 may be utilized to effect key selection and activation without depressing a key on the keyboard.

The specialized processor 110 may be a language translator, a voice synthesizer and/or any other similar-type processor which may process words, phonemes, phrases, or sentences associated with the sequence of selected tactile symbols and accessed by the microprocessor 104. Upon processing of the accessed words, phonemes, phrases, or sentences, the words, phonemes, phrases, or sentences may then be output to an analog switch 117 under the control of microprocessor 104. This circuit can send the audio output signal of specialized processor 110 to amplifier circuit 118 and then to speaker 114, as shown in FIG. 4a, to output an audible message corresponding to the accessed words, phonemes, phrases, or sentences to communicate the accessed words, phonemes, phrases, or sentences to another person. The specialized processor 110 may be one of a commercially available speech synthesizer such as the Votrax speech SPAC with the SC-01 voice synthesizer chip therein, marketed by Votrax or the commercially available DecTalk or SmoothTalker, for example.

The output of the synthesizer, or a similar specialized processor 110, may be in turn coupled to a speaker 114 as described above to generate audible synthetic speech in a manner well known in the art. Microprocessor 104 may also use the analog switch 117 to route the audio output signal from microprocessor 104 to amplifier circuit 119 and then to a private listening speaker or earphone 121 used by the operator of system 108 to receive auditory feedback from the system (during auditory scanning, for example). If the earphone detection circuit 120 indicates that no external earphone or speaker is connected, or alternatively, if the entire audio circuit system of 119, 120 and 121 is omitted, this auditory feedback signal can be routed to amplifier 118 and speaker 114. As such, in at least one embodiment of the present application, a speech synthesis system is disclosed, including the system 108 and a speech synthesizer to synthesize the output words, phonemes, phrases, or sentences.

In addition, a scanning system as disclosed in U.S. Pat. No. 5,297,041 issued Mar. 22, 1994 to Kushler et. al., the entire contents of which are hereby incorporated herein by reference, may include the system 108 described above. A row-column scanner, as disclosed in U.S. Pat. No. 5,297,041 issued Mar. 22, 1994 to Kushler et. al., may be used to detect selection of a key of the keyboard 200 implementing the tactile overlay keyboard of FIG. 2 and/or FIG. 3, for example. Thus, in at least one embodiment, a scanning system can include the system 108 and a row-column scanner to select a key.

Further, a system 108 (of FIGS. 4 and 4a for example) of an embodiment of the present application can further include a processor (such as a microprocessor 104 of FIGS. 3 and 3a for example), to determine whether or not a plurality of symbols, associated with a plurality of selected keys from keyboard 200 implementing the tactile overlay keyboard of FIG. 2 and/or FIG. 3, for example, form a sequence of selected tactile symbols associated with a word, phoneme, phrase, or sentence and accessed by the microprocessor 104, and, in response to determining that the plurality of selected tactile symbols form a sequence of symbols associated with at least one word, phoneme, phrase, or sentence, to instruct output (via output unit 107 of FIG. 4 for example) of the accessed word, phoneme, phrase, or sentence.

The apparatus 108 can also include a memory 106, to store the plurality of tactile symbol sequences, each in association with at least one word, phoneme, phrase, or sentence. The memory 106 may be used to store the plurality of tactile symbol sequences (in a database for example), each stored in association with at least one word, phoneme, phrase, or sentence. In addition, the system 108 may include a display as the output unit 107 for example, to display the output at least one word, phoneme, phrase, or sentence associated with the sequence of selected tactile symbols. Each stored tactile symbol sequence may include two or three tactile symbols, for example, each sequence associated with at least one word, phoneme, phrase, or sentence. Further, the keyboard 200 implementing the tactile overlay keyboard of FIG. 2 and/or FIG. 3, for example, may be a virtual keyboard; and the keyboard 200 and display may be integrated.

One non-limiting example of a two symbol sequence used to access at least one associated word, phoneme, phrase, or sentence is as follows:

The APPLE(t) symbol is typically associated with words related to food. For example, selecting the APPLE(t) symbol, followed by the ADJECTIVE(t) symbol may produce a symbol sequence that the processor 104 can then compare to the sequences in memory 106, to access the adjective "hungry."

In at least one embodiment as shown above, the key associated with the APPLE(t) symbol and the key associated with the VERB(t) symbol are sequentially selected. The processor 104 then compares, for example, this tactile symbol sequence to a plurality of stored symbol sequences in memory 106. This can be done for each sequentially selected key. Upon determining that the selected tactile symbol sequence corresponds one stored in memory 106, for example, and/or otherwise associated with at least one word, phoneme, phrase, or sentence, then output of the at least one word, phoneme, phrase, or sentence is instructed. As indicated above, such an output may include, for example, a display of the at least one word, phoneme, phrase, or sentence and/or a voice output. Thus, the output can include a speech synthesized output of the associated at least one word, phoneme, phrase, or sentence for each selected tactile symbol sequence. It should be noted that the two symbol sequence shown above is merely an example, as tactile symbol sequences for accessing at least one word, phoneme, phrase, or sentence can include two, three, four, five, etc. tactile symbol sequences.

Figure 5:
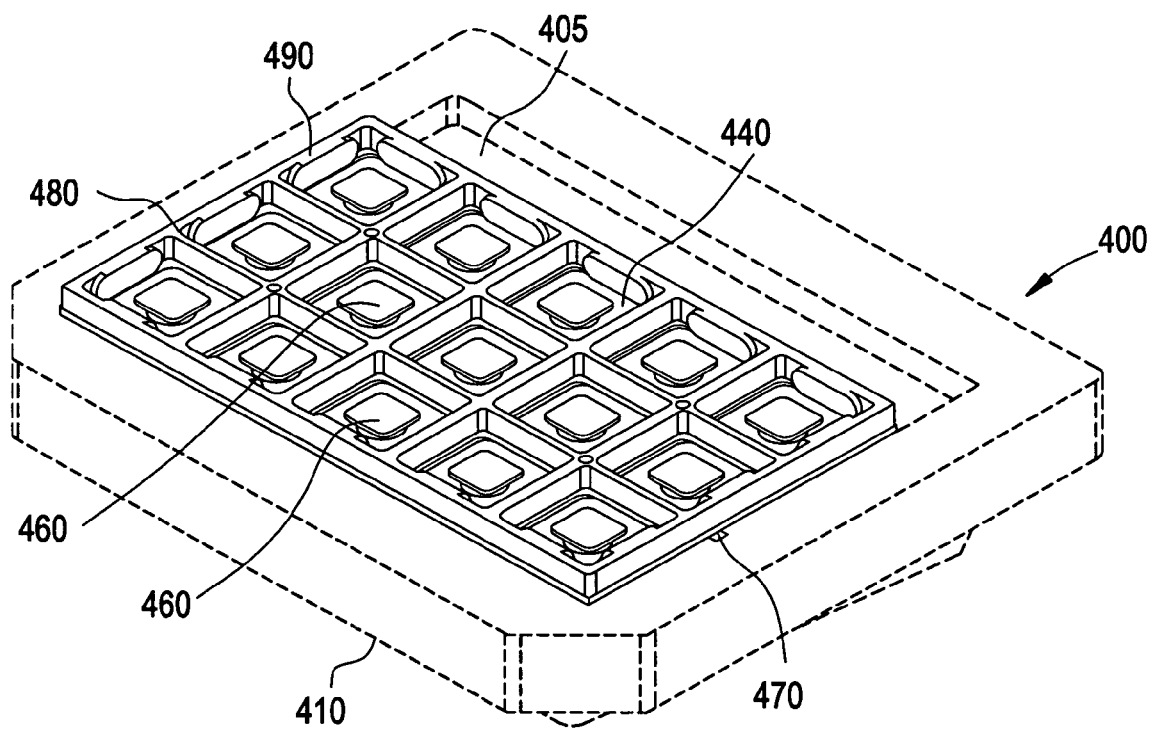
FIG. 5 illustrates an example system of the present application including an arrangement of keys mountable in a system housing.

FIGS. 5-10 show a system 400 including another arrangement of keys 460 mountable in a system housing 410 shown in dotted format, for implementing the tactile overlay keyboard of FIG. 2 and/or FIG. 3, for example. It should be understood that the system 400 of FIGS. 5-10 can represent any type of computer system including but not limited to a speech synthesizing system such as that shown in FIGS. 4 and 4a above. Such a system including system housing 410 can include components similar to the system 108 described above, including but not limited to a keyboard (described hereafter) for implementing the tactile overlay keyboard of FIG. 2 and/or FIG. 3, for example; a microprocessor such as microprocessor 104 for example, described above; a memory such as memory 106 for example, described above; and an output unit such as output unit 107 for example, described above. Thus, in an embodiment of the present application, it should be understood that a system may include not only the keyboard including a plurality of keys, at least some of the keys including polysemous symbols which provide distinctive tactile feedback to a user, as illustrated in FIG. 5; but also a processor not shown in FIGS. 5-10 (such as microprocessor 104 for example, and functioning as described regarding FIGS. 4 and 4a, and not repeated herein for the sake of brevity) to access a word, phoneme or plural word message, based upon sequentially selected ones of the polysemous symbols providing distinctive tactile feedback (as previously described regarding FIGS. 4 and 4a above, for example, and not repeated herein for the sake of brevity). Further, in an embodiment the system may include a memory not shown in FIGS. 5-10 (such as memory 106 for example, and functioning as described regarding FIGS. 4 and 4a above, and not repeated herein for the sake of brevity) to store polysemous symbol sequences in association with a word, phoneme or plural word message; and/or an output device not shown in FIGS. 5-10 (such as memory 106 for example, and functioning as described regarding FIGS. 4 and 4a above, and not repeated herein for the sake of brevity) to output the accessed word, phoneme or plural word message.

Although the screen 515 of the system 400 is not actually shown in FIG. 5 (but see FIG. 6), a user can press one or more of keys 460 of an overlay 490 which causes 520 an end 690 of a plunger 650 (see FIG. 7) to make contact with the underlying screen 515. The pressure caused by the plunger's contact activates the symbol corresponding with that symbol located at the specific site of the touch screen 515 of the system 400. The underlying system interprets the user's command and generates the desired speech output.

It may also generate a text output in a message window 405. On many AAC systems, a press of the message window 405 will generate a speech output of the full text contents of the message window 405.

Keys 460 may correspond to and include tactile symbols of an overlay of FIGS. 2 or FIG. 3 for example (or other overlay described hereafter) used to represent the language content of an existing system. As stated above, the disclosed device may useful for adapting an existing AAC or other speech synthesizing system.

It is contemplated, in an embodiment of the present application, that an overlay of FIG. 2 or FIG. 3 for example, can be adapted to numerous systems 400, such as AAC or other speech synthesizing systems. An embodiment shown in FIGS. 5-10 can adapt AAC systems that have standardized keyboard/button location layouts which remain consistent during message selection, and have content that can be represented with a static symbol set that does not change during message selection. For example, the embodiment shown in FIGS. 5-10 may be used in conjunction with AAC systems utilizing Semantic compaction techniques, such as those shown in for example, the Baker '916 patent, Baker '303 patent and/or the Kushler '041 patent. or other AAC systems that meet criteria referred to above.

The FIG. 5 embodiment illustrates how the disclosed embodiment can adapt to a system 400, such as an ACC system for example, having a 15-button layout. However, the disclosed embodiment could be used in conjunction with AAC or other systems having 4-, 8-, 15-, 32-, 45- (like FIG. 2 for example), 84- or 96-button/location layouts, or various other button/location layouts present on compatible AAC or other systems. The disclosed embodiment is thus capable of numerous configurations. A sample of the various constructions/arrangements is discussed below.

Figure 6:
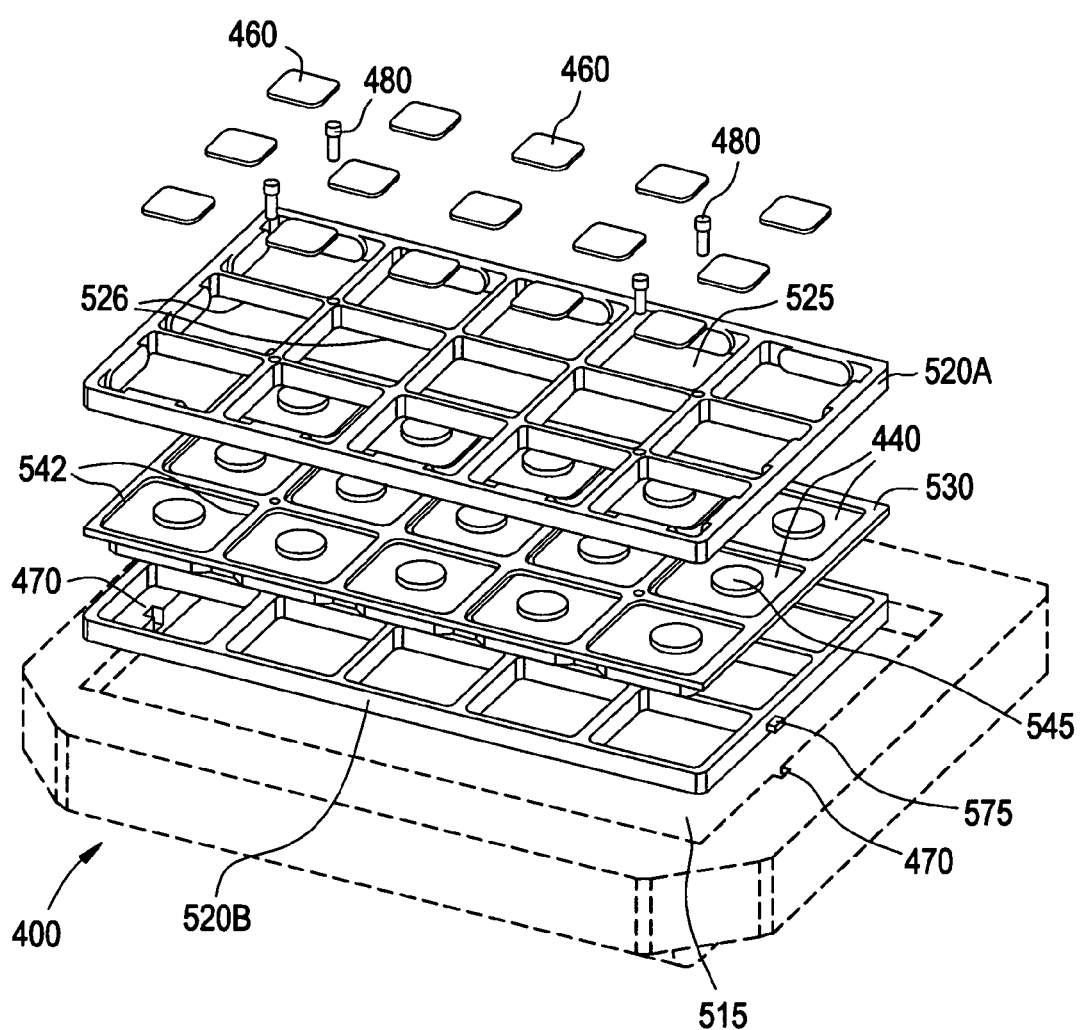
FIG. 6 shows an exploded view of the FIG. 5 embodiment.

FIG. 6 depicts an exploded view of the FIG. 5 embodiment. In this embodiment, the keys can operate like those in common dome-switch keyboards. Here, system 400 comprises a frame 520A and a membrane component 530. A portion 440 of membrane component 530 mates with a receiver member 525. A receiving gap 542 on membrane 530 can mate with edge 526 to secure the membrane and the frame. Keys 460 can mate with a surface 545 on membrane 530 to form the portion of the overlay adjacent a user of the system 400. Keys 460 can be mounted to surface 545 of membrane 530 by known devices. For example, use of hook and loop devices can provide a useful way for a user to interchange existing or default keys with customized or preferred icons.

In this embodiment, key 460 is simply rectangular in shape. However, it is contemplated that any desired tactile symbol may be utilized for tactile language representation to replace the graphic symbol of the system 400. It is also contemplated that all of these components could vary in size, shape, construction and/or location and still fall within the scope of the disclosed apparatus. Membrane 530 may be constructed of silicon rubber, although other materials could be suitable. Because of the known and potentially fatal reactions of users exposed to latex, materials containing latex would be less desired materials of construction.

Figure 7:
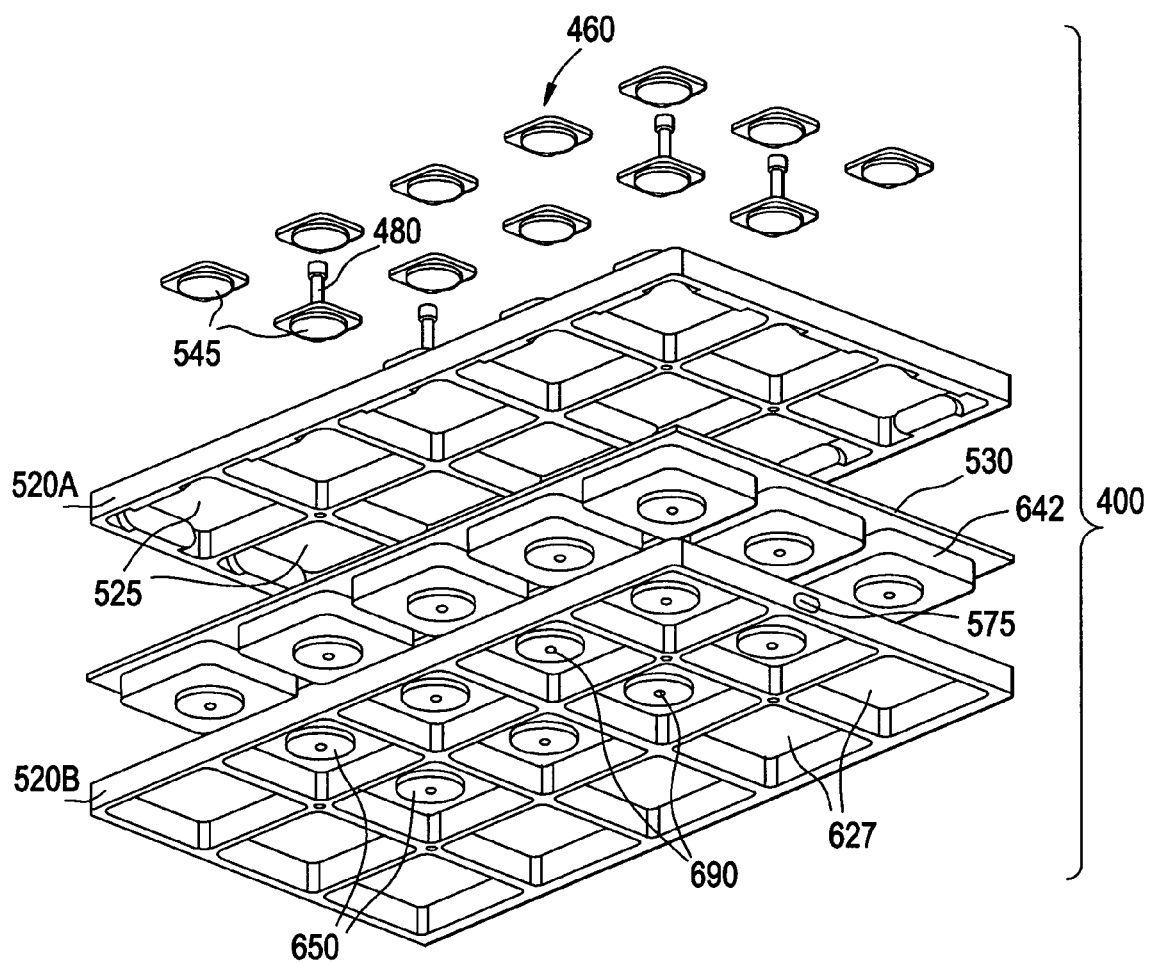
FIG. 7 shows an exploded view of the FIG. 5 embodiment.

FIG. 7 also depicts an exploded view of the FIG. 5 embodiment. As shown in FIG. 7, membrane 530 comprises one or more plunger portions 650. End 690 of plunger 650 contacts the system's screen 515 to activate the symbol that corresponds with that specific location of the screen 515. Although the conjoined frame 520A and membrane 530 are sufficient to perform this function, a user may desire a more secure placement of the overlay 400 to reduce the likelihood of shifting. Thus a frame 520B can be used to provide a base/spacer for overlay 400. A portion 642 of membrane 530 mates with a receiving member 627. To provide further security, frame 520B may be attached to the system housing 410 by optional tabs 575 which mate with optional slots 470. Frame 520B suspends overlay 400 over screen 415 but still allows for plunger contact with the screen 415. Frames 520A, 520B can be secured one to another by known attachment device 480. Frames 520A, 520B may be rigid and could be constructed out of acrylic, plastic, metal, etc. depending on the use desired. It is also contemplated that these components could vary in size, shape, construction and/or location and still fall within the scope of the disclosed apparatus.

When a user locates a desired key 460, she/he applies downward pressure to the tactile symbol which is mounted to a corresponding portion 440 of membrane 530. Plunger end 690 of membrane 530 contacts a corresponding location on screen 515 of the system, which in turn interprets the user's command and generates a speech and/or text output.

Figure 8:
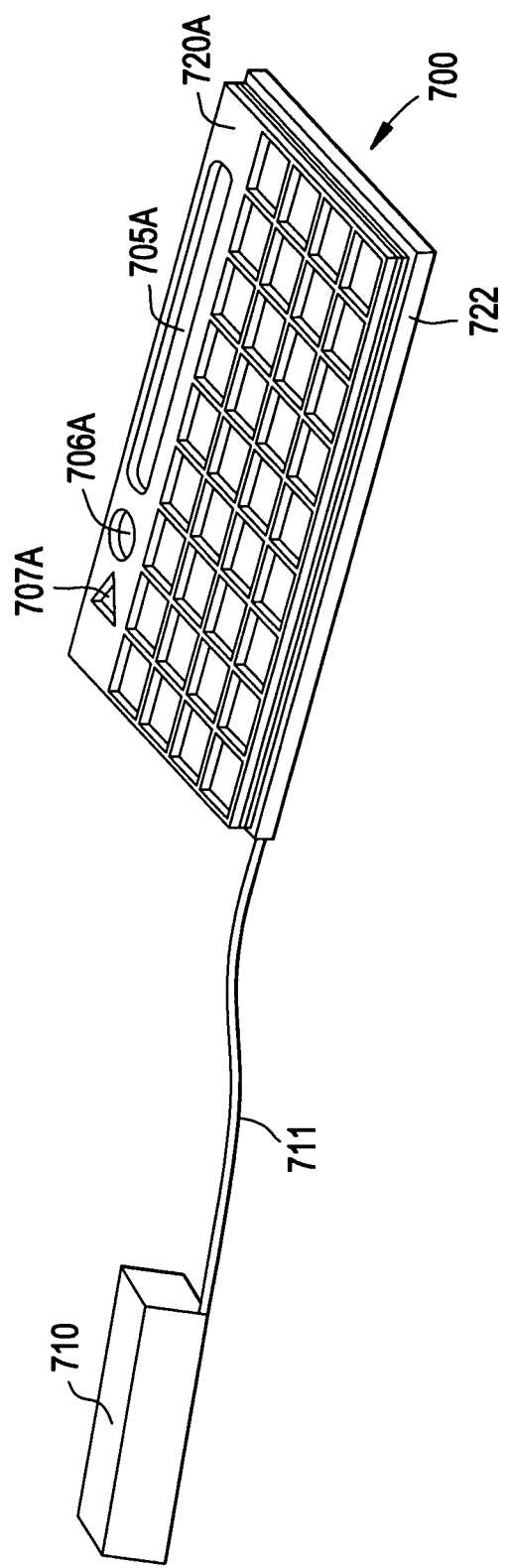
FIG. 8 shows an embodiment illustrating how the system can adapt an AAC system having a 32-button layout.
Figure 9:
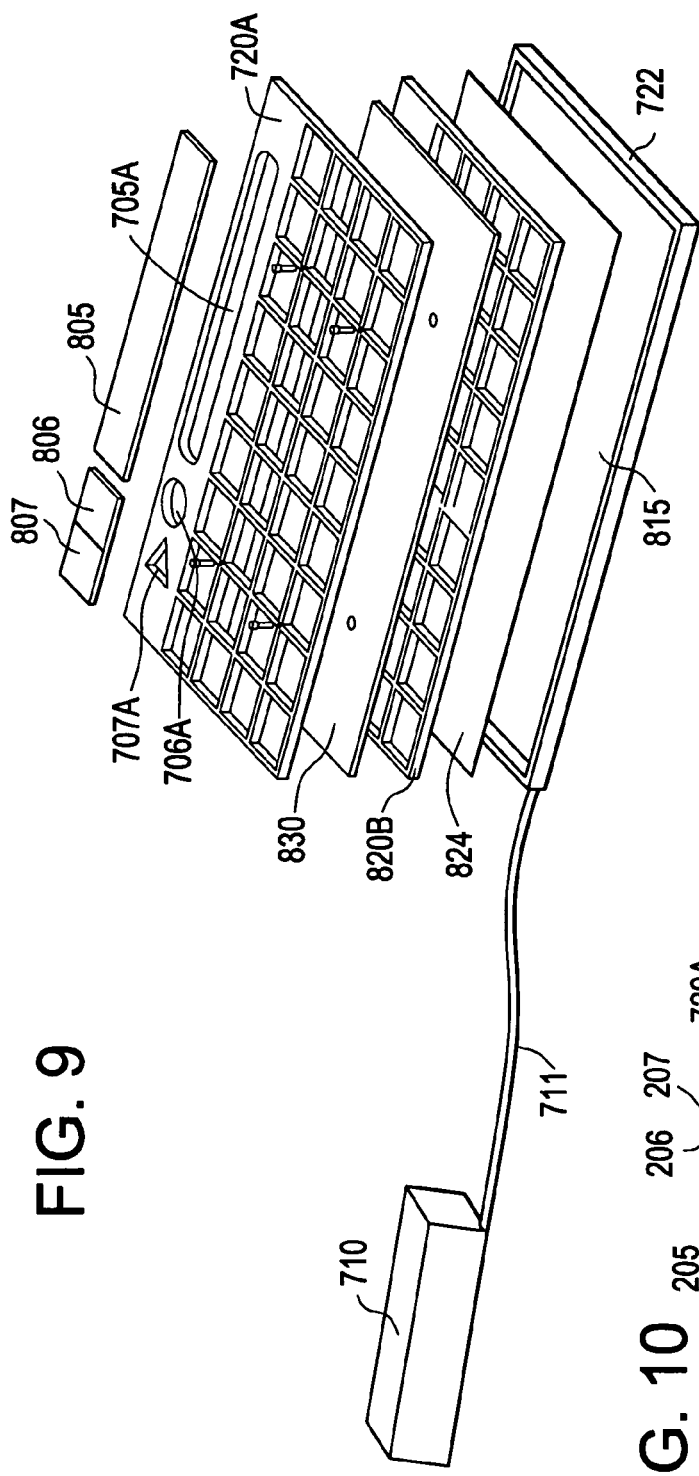
FIG. 9 shows a device of an embodiment used in conjunction with keyboards which utilize changeable commercial or user-generated overlays placed over a pressure-activated mechanism.
Figure 10:
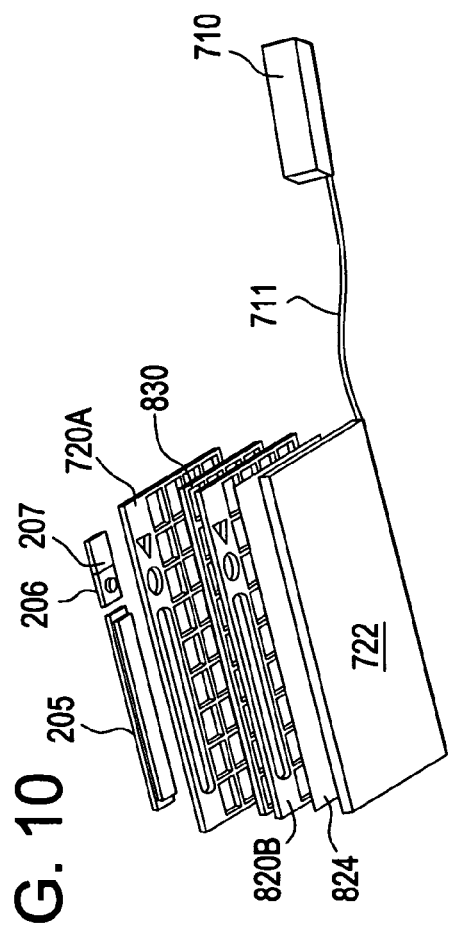
FIG. 10 shows an exploded view of the FIG. 8 embodiment seen from a bottom perspective view.

As stated above, the disclosed device is capable of numerous configurations. FIGS. 8-10 show an overlay 700 (which can include the tactile symbols of FIG. 2 or 3 for example) attachable to a system 722, such as an AAC system explained previously with regard to FIGS. 4 and 4a) for example, which can be plugged into any computer 710 by way of connection 711 (or via a wireless connection). With this embodiment, the disclosed embodiment operates like an external keyboard. This device may utilize changeable commercial or user-generated overlays 824 placed over pressure-activated mechanism 815 (as shown in FIG. 9). Some AAC systems that the disclosed device can be compatible with utilize changeable overlay 824 and pressure activated mechanism 815 as a display in the place of a touch screen. Since it is contemplated that overlay 700 could adapt to numerous AAC systems that meet the criteria referred to above, use of overlay 700 in conjunction with AAC systems utilizing changeable overlay 824 could be optional. It is further contemplated that computer 710 could comprise a compatible AAC system as well as a Macintosh8' or Windows8-based machine. The FIG. 8 embodiment illustrates how the system can adapt an AAC system having a 32-button layout. However, the disclosed device could be used to adapt AAC systems having 4-, 8-, 15-, 32-, 45-(like FIG. 2 for example), 84- or 96-button/location layouts, or various other button/location layouts present on compatible AAC systems FIG. 10 depicts an exploded view of the FIG. 8 embodiment seen from a bottom perspective view. In this embodiment, overlay 700 comprises frame 720A and a membrane 830. The assembly of 720A and membrane 830 is similar to that described above. Frame 820B provides a base/spacer for the overlay 700. Frames 720A, 820B can be secured one to another by known attachment device 480. Frames 720A, 820B may be rigid and could be constructed out of acrylic, plastic, metal, etc. depending on the use desired. It is also contemplated that these components could vary in size, shape, construction and/or location and still fall within the scope of the disclosed apparatus. Membrane 830 may be constructed of silicon rubber although other materials could be used if suitable. Because of the known and potentially fatal reactions of users exposed to latex, materials containing latex would be less desired materials of construction.

Keys 805, 806, 807 and 860 (not shown) are mountable in receiving members 15 705A, 706A, 707A and 760A (not shown) respectively and may take the form of any desired tactile symbol useful to replace a visual symbol on the AAC system's pressure activated mechanism 815 or overlay 824. When pressed, these keys activate certain functions of the underlying AAC system which in turn interprets the user's command and/or generates a speech or text output. For example, keys 806 and 807 may control auditory scanning as an alternative selection method. The incorporation of auditory scanning in conjunction with direct selection may provide access to additional content not adapted elsewhere for tactile language representation. The overlay 824 area underlying key 805 and receiving member 705A could be left exposed so as to reveal text output if a message window is present.

The disclosed embodiments of FIGS. 5-10 adapt the visual language content on an existing AAC system for tactile language representation. They make communication with this system accessible to users who have visual impairments or are otherwise unable to process the visually presented language content. Existing AAC systems have many different vocabulary sets, or user areas, which provide language representation for users with different ranges of abilities. The different user areas may have different numbers of buttons and different button locations, which are arranged in standardized grid formats.

The disclosed embodiments of FIGS. 5-10 can be compatible with all user areas on an AAC system that uses a standard button/location layout, such as a grid of 4-, 8-, 15-, 32-, 45-, 84- or 96-button/locations, and has content that can be represented with a static symbol set. These button/location layouts described herein are used for example purposes only and describe the technology available at this time. However, as technological advancements are made, such that button/location layouts are increased or otherwise changed, it is contemplated that the disclosed device can be used to adapt such systems.

Although the disclosed systems and methods have been described with reference to disclosed embodiments, numerous modifications and variations can be made and still the result will come within the scope of the disclosure. No limitation with respect to the specific embodiments disclosed herein is intended or should be inferred.

An embodiment of the present application is directed to a tactile keyboard key location symbol set that can make direct selection of MinSpeak language accessible to users with visual impairments. Such a tactile language representation system can be achieved using Semantic Compaction principles of a system disclosed in, for example, the Baker '916 patent, Baker '303 patent and/or the Kushler '041 patent to support a large vocabulary with relatively few multi-meaning symbols and minimize the number of button hits needed for message selection.

A set of keyboard key location tactile symbols in an embodiment of the present application may, as described above, be closely matched to the established Unity Language map built using MinSpeak icons, such as those shown in for example, the Baker '916 patent, Baker '303 patent and/or the Kushler '041 patent. As such, direct selection of Unity Language may be made available to users with visual impairments through a series of alternative tactile user interfaces compatible with different user areas, and a developmental approach is used to teach users to access this language content.

The keyboard key location tactile symbol sets may include, for example, tactile graphics and elements of Braille orthography. Differences between systems may include that the keyboard key location tactile symbols may be made using different manufacturing methods. It should be understood that the keyboard key location tactile symbols of each of FIGS. 11-14 CAN be used in conjunction with the embodiments of systems described in FIGS. 4-10.

Figure 11:
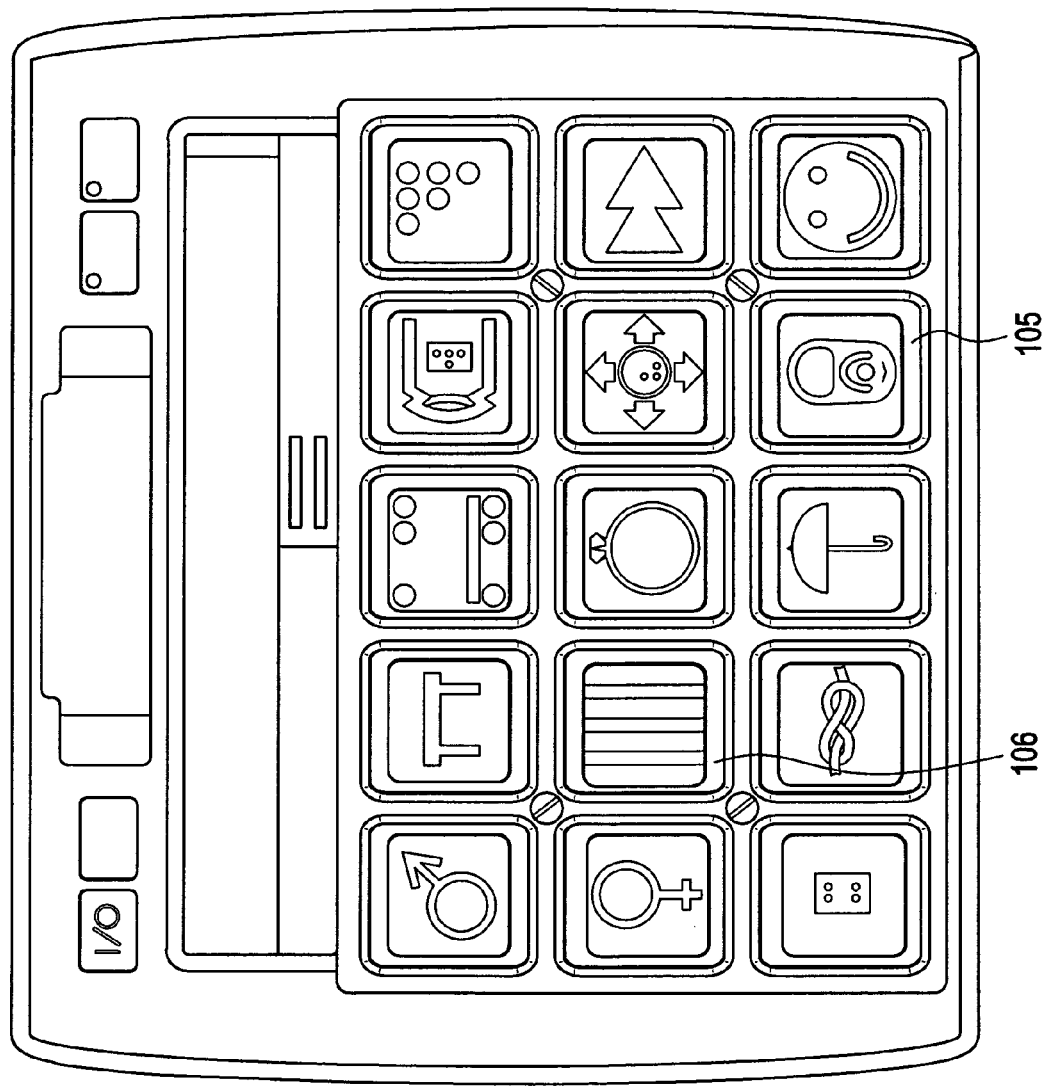
FIG. 11 shows a 15-location Tactile Overlay of an embodiment of the present application.

The keyboard key location tactile symbols for the system in FIG. 11 may be made using a vacuum forming process called thermoforming that is a known method of making tactile graphics in text books adapted for people who are blind. All of the symbols may be made on a single sheet, which is vacuum formed around a master set of symbols in a Thermoforming machine. Master symbols for this set may be taken from the sets shown in FIG. 12 and FIG. 13.

Figure 12:
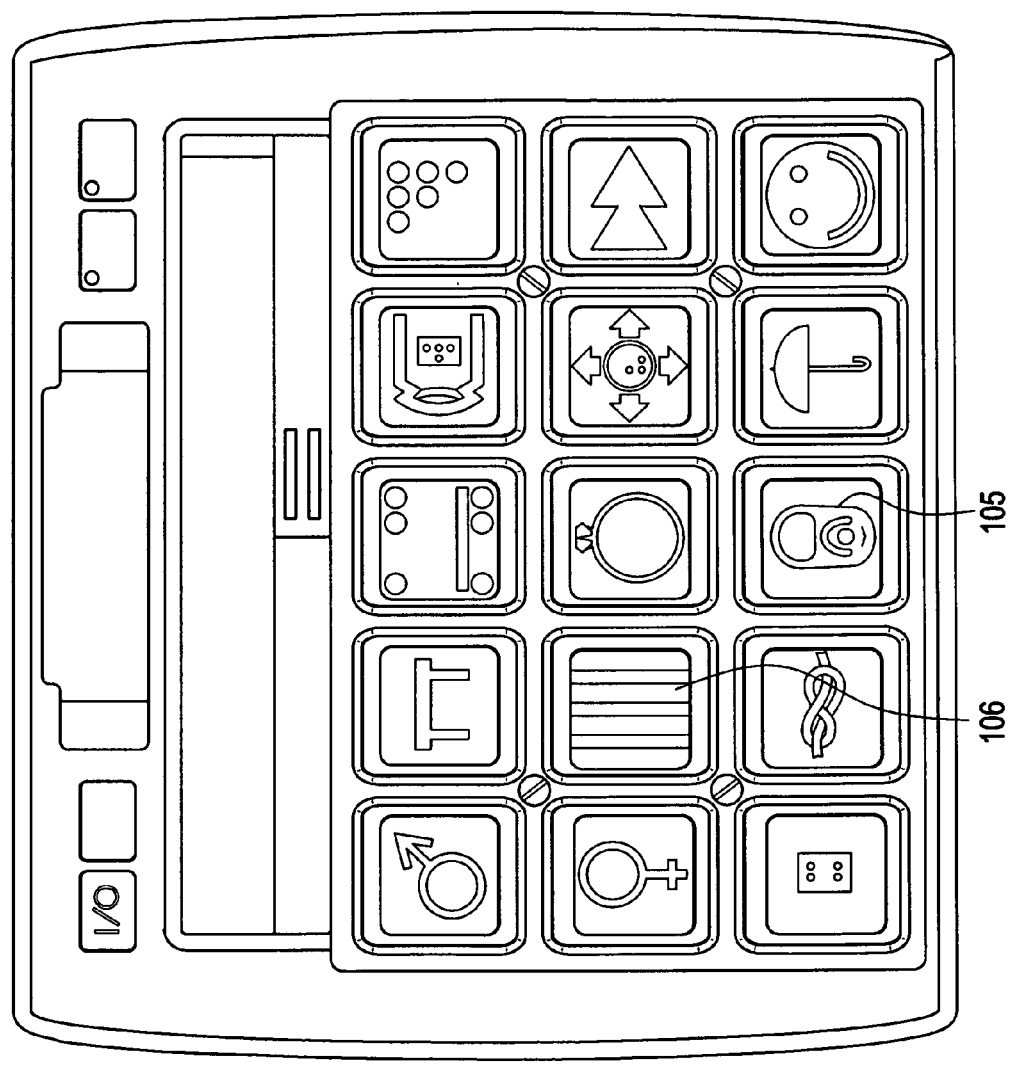
FIG. 12 shows a 15-location Tactile Overlay of an embodiment of the present application using manual construction and a wide variety of materials.

The keyboard key location tactile symbols for the system in FIG. 12 may be made using manual construction and a wide variety of materials found in a typical craft store. Manually constructed symbols like this are often used in clinical practice with potential end-users as non-polysemous symbols.

Figure 13:
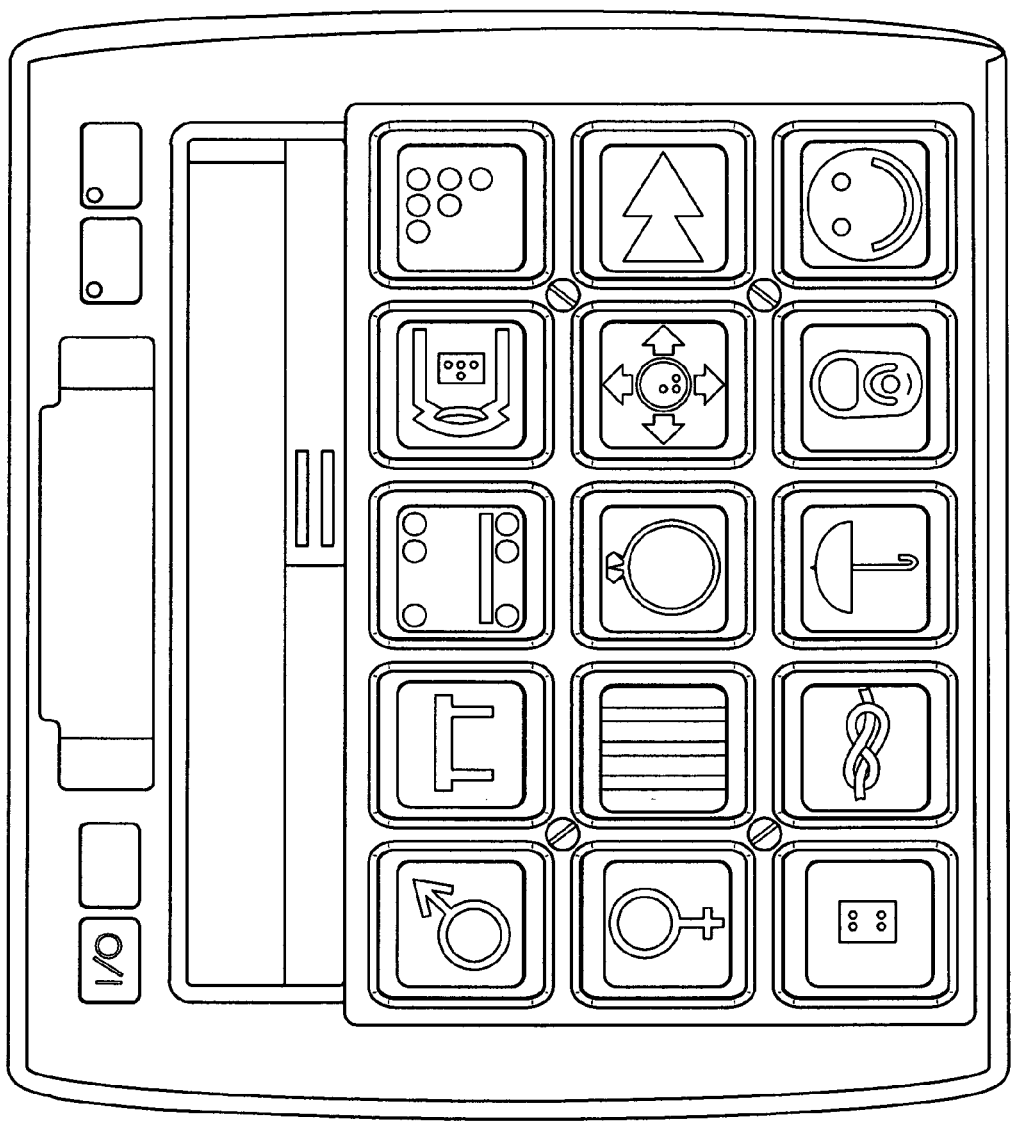
FIG. 13 shows a 15-location Tactile Overlay of an embodiment of the present application made using a CNC guided laser engraving machine.

The keyboard key location tactile symbols for the system in FIG. 13 may be made using a CNC guided laser engraving machine that engraves the symbols into a sheet of laminated plastic. The laser engraver removes material from the upper cap layer of laminated plastic, revealing the core layer, which is a contrasting color. These symbols may be topographical, with two layers of depth indicated by different colors.

In the above examples, these keyboard key location tactile symbols may be used sequenced polysemous symbols as described in the Baker '916 patent, Baker '303 patent and/or the Kushler '041 patent, for example. For example, selection of the symbols in the far left column two consecutive times could produce "he", "she", and "it" for example.

The symbol 105 in the bottom of the fourth column of FIG. 11, which is shaped like the tab on top of a pop can, may correlate to the JUICE(g) symbol on many graphic systems such as those described in the Baker '916 patent, Baker '303 patent and/or the Kushler '041 patent, for example. One of the words this symbol may represent may be the auxiliary verb "can." Selecting a pronoun symbol followed by the CAN(t) symbol may produce a symbol sequence that the processor 104 can then compare to the sequences in memory 106, to access a statement, "he can", "she can", and "it can." Selecting the CAN(t) symbol followed by a pronoun icon produces a question, "can he", "can she", and "can it".

The WANT(t) symbol 106 in the center of the second column of FIG. 11, which has parallel prison bars, may correlate to the WANT(g) symbol on many graphic systems as described in the Baker '916 patent, Baker '303 patent and/or the Kushler '041 patent, for example. One of the words this symbol may represent is the verb "want." Selecting a pronoun icon followed by the "want" icon may produce a symbol sequence that the processor 104 can then compare to the sequences in memory 106, to access a statement, "he wants", "she wants", and "it wants". Notice that the form of "want" may be changed to meet rules for subject-verb agreement in these phrases. Selecting the WANT(t) symbol followed by a pronoun symbol produces a symbol sequence that the processor 104 can then compare to the sequences in memory 106, to access a question, "does he want", "does she want", and "does it want".

These are non-limiting examples of tactile symbols in at least one embodiment of the present application, which are designed to associate with the underlying language content on an existing graphic symbol system without changing the organization of the underlying language content. The translation process for developing these symbols is described above.

Figure 14:
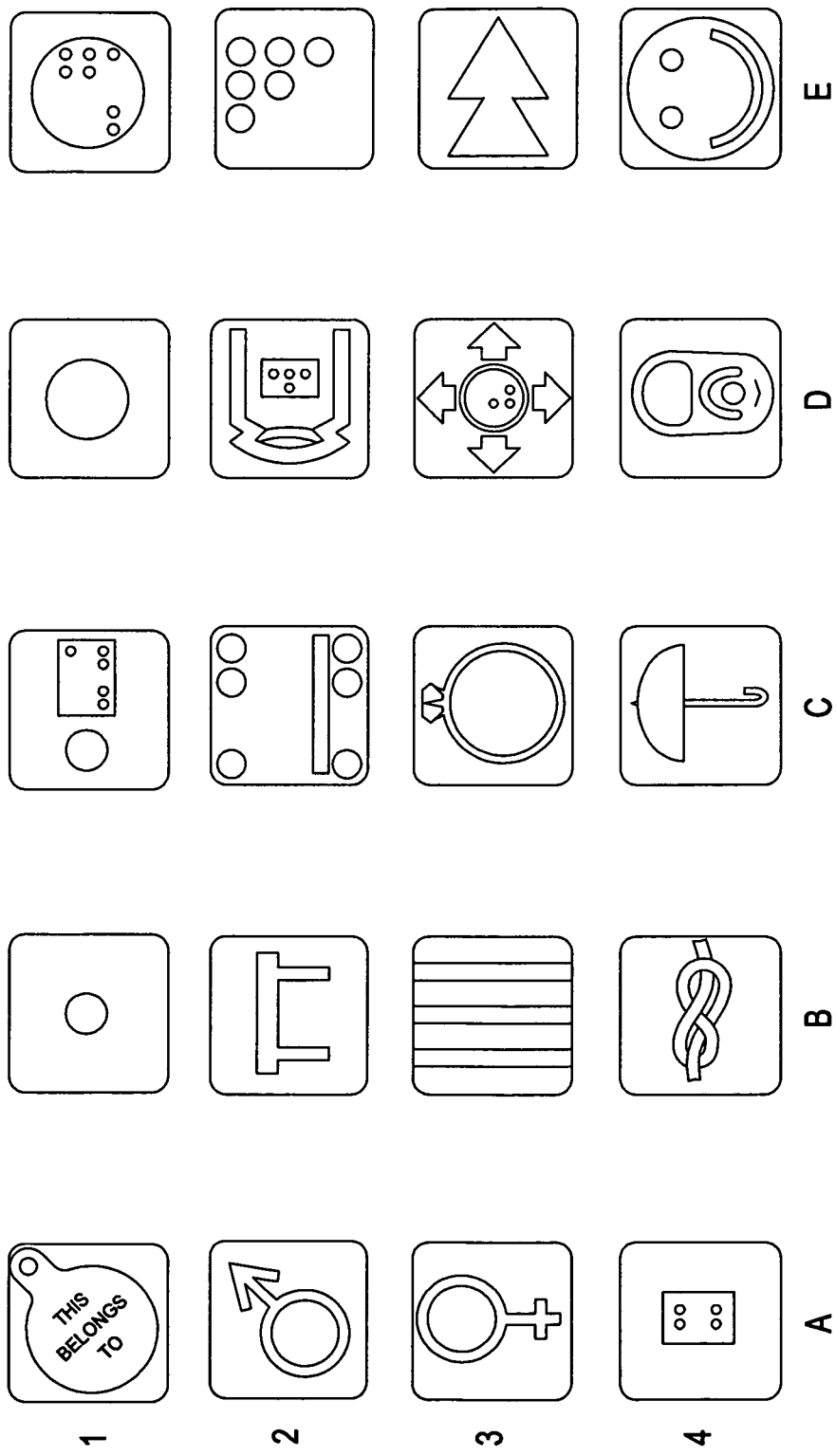
FIG. 14 shows an example embodiment of a 20-location Tactile Overlay keyboard.

FIG. 14 shows an example of 20 keyboard key location tactile symbols for a system. Rows B, C, and D are identical to the fifteen symbols on FIGS. 11-13. FIG. 14 shown here is a digital drawing that serves as a topographical guide to production of real tactile symbols. For most of the tactile symbols, black areas are recessed and white areas are raised. For the BOOK(t) symbol, there are multiple layers, each represented with a different color.

From left to right going from columns A-E, the example tactile symbols in row 1 include a POSS(t) symbol that may be a pet ID tag used to indicate possession, the VERB(t) symbol discussed above, a VERB+ING(t) symbol used in the production of present progressive verbs, an ADJECTIVE(t) symbol used to produce adjectives in the positive form, and an ADJECTIVE+ER(t) symbol used to produce adjectives in the comparative form. On the tactile symbols representing verb forms (the VERB(t) and VERB+ING(t) tactile symbols B1 and C1 of row 1 of FIG. 14), the grey circle may be a movable ball bearing for example, which can convey the concept of action as the user can manipulate the mechanical action of the ball bearing. The Braille on the VERB+ING(t) symbol C1 in row 1 may represent or include the -ing ending for a present progressive verb symbol and the ADJECTIVE+ER(t) symbol E1 in row 1 may represent or include -er ending for the comparative adjective form. These tactile symbols expand the previous examples in that they are polysemic, as will be explained hereafter.

The SHE(t) symbol in space A3 of FIG. 14 may be associated with feminine pronouns. If a user selects this tactile symbol twice consecutively, it may produce a symbol sequence that the processor 104 can then compare to the sequences in memory 106, to access the word output "she", for example. The POSS(t) symbol in space A1 may be associated with possessive pronouns. Selecting the SHE(t) symbol A3 and then the POSS(t) symbol A1 may produce a symbol sequence that the processor 104 can then compare to the sequences in memory 106, to access the word output "her", for example. Reversing this sequence, by selecting the POSS(t) symbol A1 and then the SHE(t) symbol A3 may produce a symbol sequence that the processor 104 can then compare to the sequences in memory 106, to access the word output "hers", for example.

Similar patterns can be used to produce "he," and "his" using the HE(t) symbol in space A2, which may be associated with masculine pronouns and the POSS(t) symbol in space A1. Similar patterns can also be used to produce "it" and "its" using the IT(t) symbol associated with neuter pronouns in space A4 and the POSS(t) symbol in space A1. By selecting these pronoun tactile symbols in sequences, the operator can utilize rule-based patterns to produce eleven different pronouns with only four total symbols.

The CAN(t) symbol in space D4, which may be shaped like the tab on top of a pop can, may be used to correlate to a JUICE(g) symbol on many graphic MinSpeak systems and/or any one or more of the Baker '916 patent, Baker '303 patent and/or the Kushler '041 patent, for example. One of the words this symbol may represent is the auxiliary verb "can" (the symbol representing a juice "can" top). Selecting a pronoun tactile symbol of FIG. 14 followed by the "can" tactile symbol may produce, for example, a symbol sequence that the processor 104 can then compare to the sequences in memory 106, to access a statement, "he can", "she can", and "it can", etc. Selecting the "can" tactile symbol followed by a pronoun tactile symbol may produce, for example, a symbol sequence that the processor 104 can then compare to the sequences in memory 106, to access a question, "can he", "can she", and "can it", etc.

However, this same CAN(t) symbol D4 of FIG. 14 may also be used to produce forms of the verb "to drink" (you "drink" juice from a can). The infinitive form "drink" can be produced by selecting, for example, the CAN(t) symbol in space D4 followed by the VERB(t) symbol in space B1. The present progressive form "drinking" can be produced by selecting the CAN(t) symbol in space D4 followed by the VERB+ING(t) symbol in space C1 to produce a symbol sequence that the processor 104 can then compare to the sequences in memory 106 to access present progressive form "drinking". By selecting the CAN(t) symbol in D4 followed by the ADJECTIVE(t) symbol in D1, the user can produce a symbol sequence that the processor 104 can then compare to the sequences in memory 106 to access the adjective "thirsty." The comparative form of this tactile symbol can be produced by selecting the CAN(t) symbol in D4 followed by the ADJECTIVE+ER(t) symbol in E1 to produce a symbol sequence that the processor 104 can then compare to the sequences in memory 106 to access the comparative form of this tactile symbol. Thus, this represents how these symbols, such as the CAN(t) symbol in D4 for example, can be multi-meaning, or polysemous tactile symbols.

The RING(t) symbol in space C3 of FIG. 14 may resemble a diamond wedding ring, to correlate to the RING(g) symbol on many graphic MinSpeak systems and/or any one or more of the Baker '916 patent, Baker '303 patent and/or the Kushler '041 patent, for example. One of the words this symbol may represent is the verb "do" (the wedding ring being synonymous with the phrase "I do"). Selecting a pronoun tactile symbol followed by the RING(t) symbol may produce a symbol sequence that the processor 104 can then compare to the sequences in memory 106 to access a statement, "he does", "she does", and "it does", etc. Notice that the form of "do" may be changed to meet rules for subject-verb agreement in these phrases. Selecting the RING(t) symbol followed by a pronoun tactile symbol may produce a symbol sequence that the processor 104 can then compare to the sequences in memory 106 to access a question, "does he", "does she", and "does it". Forms of the verb "to do" can be produced by selecting the RING(t) symbol in C3 followed by one of the verb form tactile symbols. Selecting the RING(t) symbol in C3 followed by the VERB(t) symbol in B1 may produce a symbol sequence that the processor 104 can then compare to the sequences in memory 106 to access the word "do." Selecting the RING(t) symbol in C3 followed by the VERB+ING(t) symbol in C1 may produce a symbol sequence that the processor 104 can then compare to the sequences in memory 106 to access the word "doing." These patterns are similar to the patterns described above to produce "drink" and "drinking" using the CAN(t) symbol.

Forms of the adjective "important" can be produced by selecting the RING(t) symbol followed by one of the adjective form tactile symbols (rings are "important"). The positive form "important" can be produced by selecting the RING(t) symbol in C3 followed by the ADJECTIVE(t) symbol in D1 to produce a symbol sequence that the processor 104 can then compare to the sequences in memory 106 to access the positive form "important". The comparative form "more important" can be produced by selecting the RING(t) symbol in C3 followed by the ADJECTIVE+ER(t) symbol in E1 to produce a symbol sequence that the processor 104 can then compare to the sequences in memory 106 to access the comparative form "more important". Again, this pattern is similar to the rule-based pattern to produce forms of "thirsty" described above. Thus, this represents how these tactile symbols, such as RING(t) symbol C3 for example, can be multi-meaning, or polysemous tactile symbols.

These are non-limiting examples of tactile symbols of an embodiment of the present application, which may be designed to associate with the underlying language content on an existing polysemous graphic symbol system without changing the organization of the underlying language content. The translation process for developing these symbols is described above. Further, although the polysemousness of only a few symbols has been described, it should be apparent how at least some of the other symbols, especially of FIGS. 2 and 14, can have multiple meanings and thus can also be polysemous.

It should further be noted that any of the sets of keyboard key location tactile symbol sets shown in FIGS. 11-14 can be implemented on the keyboards of any of the systems shown in FIGS. 4-10, as would be understood by one of ordinary skill in the art.

An embodiment of the present application may further be directed to a method of producing dynamically redefined auditory feedback as a prompt to the operator specifying the content of the current stored message that could be produced by actuation of one of less than all of a plurality of keys on a keyboard that each correlate with non-polysemous graphic symbols that are dynamically redefined in response to sequentially selected polysemous or non-polysemous symbols as disclosed in the Baker '303 design. In the system and/or method of an embodiment of the present application, a first actuation of one of the keys on the dynamically redefined keyboard for accessing fringe vocabulary may produce a dynamically redefined auditory feedback to indicate the current message stored at the key. A second consecutive actuation of the same key may then select the current message stored at the key.

The dynamically redefined auditory feedback utilized in the system of an embodiment of the present application may be a method in the field alternately called auditory prompting or audio touch which may be used as a prompt for all of the plurality of keys on the keyboard of previous systems. Auditory prompting occurs when an AAC system speaks the name of a symbol upon the first activation as a prompt, such that a second activation of the same symbol may be required to select it. In the system of an embodiment of the present application, the use of dynamically redefined auditory feedback may be limited to the less than all of the plurality of keys on the keyboard that are utilized as a dynamically redefined keyboard for accessing fringe vocabulary. Thus, the selection of core vocabulary using sequenced polysemous tactile symbols may remain efficient and does not require an additional actuation of each key in the sequence to accommodate auditory feedback, while the selection of fringe vocabulary using the dynamically redefined keyboard may be transparent. Thus, an embodiment of the present application includes providing an audible output upon selection of one of the polysemous symbols, the audible output corresponding to a category represented by the selected polysemous symbol and may further include providing a second audible output, upon selection of a subsequent one of the polysemous symbols, the audible output corresponding to a subcategory represented by the sequenced selected polysemous symbols.

For example, a user may wish to say "eat dessert." The user can access the core word "eat" with a minimal number of keystrokes by selecting two sequenced polysemous tactile symbols: APPLE(t) and VERB(t), for example. However, the user may need to use a dynamically redefined keyboard to access the fringe word, "dessert."

The user may select the polysemous tactile symbol APPLE (t) in an embodiment of the present application to set the semantic category of words in the dynamically redefined keyboard. Then, for example, the user may activate one symbol on the dynamically redefined keyboard and hear the auditory prompt "breakfast." The user may know from the prompt that this is not the desired symbol, so the user may then activate another symbol from the dynamically redefined keyboard and hear the auditory prompt "dessert." The user may then activate the "dessert" symbol one more time to select the target word and correctly produce the phrase "eat dessert."

In an embodiment of the present application, a method and/or system may be provided with at least one tactile element that may enhance an operator's efficiency when navigating the keyboard using only the sense of touch. Historically, tactile elements have been used as reference point to help people with vision impairments or blindness identify central locations on traditional keyboards, so that other locations can be identified based on their proximity to these features. For example, there is often a raised dot on the number five key, which is located in the center of traditional number keypads. Strategically placed tactile reference points in an embodiment of the present application may enhance navigation between symbols, a raised dot located on the keyguard between symbols, for example.

In known polysemous symbol systems, less than all of a plurality of keys may be dynamically redefined and replaced or embellished with single meaning pictures used to represent a large fringe vocabulary, while less than all of a plurality of keys are maintained as polysemous symbols to access core vocabulary. It may not be feasible to use dynamically redefined tactile symbols to replace rapidly changing single meaning pictures. However, in an embodiment of the present application, auditory prompting may be selectively used with less than all of a plurality of tactile symbols associated with an underlying dynamically redefined keyboard to help users identify content before making a selection.

In an embodiment of the present application, a method and/or system may be provided wherein dynamically redefined tactile feedback may be accessed upon detecting that a first key has been activated, to provide a user with a system and/or method which quickly and efficiently define a limited number of keys which can produce a stored message involving an initially detected icon on an initially activated key. Dynamic tactile feedback currently exists on refreshable Braille displays, which may serve as a computer monitor for a person who reads Braille. On a refreshable Braille display, individual pins are dynamically raised or lowered to change the displayed configuration of Braille dots as a user reads through documents. Dynamically redefined tactile feedback in an embodiment of the present application may be provided using a similar mechanism; such a single refreshable pin on each symbol, for example. Depending on context, the pin may be in a raised or lowered position, oscillate between these positions, or vibrate.

In an embodiment of the present application, a method and/or system may be provided wherein dynamically redefined auditory feedback may be accessed upon detecting that one of less than all of a plurality of keys on the keyboard whose content is dynamically redefined has been activated to provide a user with a system and/or method which quickly and efficiently define the stored message currently available upon further activation of the same key.

In an embodiment of the present application, in at least one embodiment of a system and/or method of polysemous tactile symbols as mentioned above, one or more tactile elements may be included, in addition to the plurality of polysemous tactile symbols, that is used as a guide during manual exploration of the keyboard and plurality of polysemous tactile symbols. For example, the operator may use one or more tactile features in a constant location as a reference point to enhance tactual keyboard navigation based on the spatial relationships between the one or more tactile feature used as a reference point and the plurality of polysemous tactile symbols. Reference points, such as raised dots positioned at central locations, can help users who are blind locate keys on standard keyboards by providing a unique feature at a known location that does not map to any linguistic meanings. A user may use a reference point as a starting point for tactually exploring the keyboard and locating a symbol that is a known distance from the reference point; three spaces to the left and one space above the reference point, for example.

A predictive selection system in U.S. Pat. No. 5,297,041 awarded to Kushler, et al (the Kushler '041 patent) issued Mar. 22, 1994, the entire contents of which are hereby incorporated herein by reference, operates in conjunction with a keyboard containing a plurality of polysemous symbols and provides a method to limit the number of valid keys after actuation of an initially detected symbol to a limited number of keys which can produce a stored message involving that initially detected symbol. Those invalid keys which cannot produce a stored message involving that initially detected symbol temporarily do not respond if activated. In addition, visual and/or auditory indicators provide feedback to the user to indicate which keys can be validly selected to produce a stored message involving the initially detected symbol.

The system of an embodiment of the present application may provide a method for predictive selection with tactile feedback that operates in conjunction with a system of polysemous tactile symbols, for example. As in the system of the Kushler '041 patent, the system of an embodiment of the present application limits the number of valid keys after actuation of an initially detected symbol to a limited number of keys which can produce a stored message involving that initially detected symbol. Tactile indicators, vibration localized at the site of one or more valid key for example, provide tactile feedback to the user to indicate which keys can be validly selected to produce a stored message involving the initially detected symbol.

Therefore, an embodiment of the present application may enhance the feedback of the previous linguistic encoding systems, including utilizing a keyboard with polysemic tactile symbols associated with each of the plurality of keys. Therefore, by systematically identifying the messages associated with each previous polysemous graphic symbol and replacing the polysemous graphic symbol with a polysemous tactile symbol that can be associated with the same underlying meaning, at least one embodiment of the present application translates the content of the previous system from a graphic modality to a tactile modality through a process that modifies symbols without modifying the underlying content. Thus, such a system can be realized, which may enhance access for an operator without sight.

The example embodiment or each example embodiment should not be understood as a restriction of the application. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used indicate a further embodiment of the subject matter by way of the features; they should not be understood as dispensing with obtaining independent protection of the subject matter for the combinations of features referred-back. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
providing a hardware keyboard including a plurality of keys, at least some of the keys including at least one of engraved and embossed surfaces depicting polysemous symbols, each at least one of engraved and embossed surface of a respective one of the plurality of keys providing distinctive tactile feedback to a user, indicative of a corresponding one of the polysemous symbols, the distinctive tactile feedback being provided upon the user contacting respective polysemous symbols on the keys; and
accessing a word, phoneme or plural word message, based upon sequentially selected ones of the polysemous symbols providing distinctive tactile feedback, wherein the keyboard includes one or more tactile elements, in addition to the plurality of polysemous symbols, usable as a guide during manual exploration of the keyboard.

2. The method of claim 1, wherein a plurality of the polysemous symbols include three-dimensional characteristics.

3. The method of claim 2, wherein the three-dimensional characteristics provide distinctive tactile feedback indicative of the symbol to a user.

4. The method of claim 2, wherein a plurality of the polysemous symbols which provide distinctive tactile feedback to a user are differentiatable by tactile characteristics.

5. The method of claim 4, wherein the three-dimensional characteristics provide distinctive tactile feedback indicative of a polysemous symbol to a user.

6. The method of claim 1, wherein at least one of the plurality of polysemous symbols at least partly provides electrically activated vibratory or haptic feedback.

7. The method of claim 1, wherein a shape of a polysemous symbol is used to provide distinctive tactile feedback indicative of a polysemous symbol to a user.

8. The method of claim 1, wherein topography of a polysemous symbol is used to provide distinctive tactile feedback indicative of a polysemous symbol to a user.

9. The method of claim 1, wherein at least one of color and other visual characteristics of a symbol is used to provide distinctive tactile feedback indicative of a polysemous symbol to a user.

10. The method of claim 1, wherein auditory feedback is provided for less than all of the plurality of keys on the keyboard.

11. The method of claim 1, wherein vibration, localized at a site of one or more keys of the keyboard, provides tactile feedback to the user to indicate validly selectable keys.

12. The method of claim 1, wherein after actuation of an initially detected symbol, only keys which can produce a stored message involving that initially detected symbol are made validly selectable.

13. The method of claim 12, wherein vibration, localized at a site of one or more keys of the keyboard, provides tactile feedback to the user to indicate the validly selectable keys.

14. The method of claim 1, wherein one or more keys of the keyboard includes at least one moving part such that movement of the at least one moving part is used to provide distinctive tactile feedback indicative of a polysemous symbol to a user.

15. The method of claim 1, further comprising:
storing polysemous symbol sequences in association with a word, phoneme or plural word message.

16. The method of claim 1, further comprising:
outputting the accessed word, phoneme or plural word message.

17. The method of claim 15, further comprising:
outputting the accessed word, phoneme or plural word message.

18. The method of claim 1, further comprising:
providing an audible output upon selection of one of the polysemous symbols, the audible output corresponding to a category represented by the selected polysemous symbol.

19. The method of claim 18, further comprising:
providing a second audible output, upon selection of a subsequent one of the polysemous symbols, the audible output corresponding to a subcategory represented by the sequenced selected polysemous symbols.

20. The method of claim 1, wherein at least two of the keys are associated with polysemous symbols of different textures to provide distinctive tactile feedback to the user.

21. A method, comprising:
providing a hardware keyboard including a plurality of keys, at least some of the keys including at least one of engraved and embossed surfaces depicting polysemous symbols, each at least one of engraved and embossed surface of a respective one of the plurality of keys providing distinctive tactile feedback to a user, indicative of a corresponding one of the polysemous symbols, the distinctive tactile feedback being provided upon the user contacting respective polysemous symbols on the keys; and
accessing a word, phoneme or plural word message, based upon sequentially selected ones of the polysemous symbols providing distinctive tactile feedback, wherein a polysemous symbol including one or more tactile features is placed in a constant location of the keyboard as a reference point to enhance tactual navigation of the keyboard.

22. The method of claim 21, wherein at least two of the keys are associated with polysemous symbols of different textures to provide distinctive tactile feedback to the user.

23. A system, comprising:
a hardware keyboard, including a plurality of keys, at least some of the keys including at least one of engraved and embossed surfaces depicting polysemous symbols, each at least one of engraved and embossed surface of a respective one of the plurality of keys providing distinctive tactile feedback to a user, indicative of a corresponding one of the polysemous symbols, the distinctive tactile feedback being provided upon the user contacting respective polysemous symbols on the keys, wherein the keyboard includes one or more tactile elements, in addition to the plurality of polysemous symbols, usable as a guide during manual exploration of the keyboard; and
a processor to access a word, phoneme or plural word message, based upon sequentially selected ones of the polysemous symbols providing distinctive tactile feedback.

24. The system of claim 23, wherein a plurality of the polysemous symbols include three-dimensional characteristics.

25. The system of claim 24, wherein the three-dimensional characteristics provide distinctive tactile feedback indicative of the symbol to a user.

26. The system of claim 23, wherein a plurality of the polysemous symbols which provide distinctive tactile feedback to a user are differentiatable by tactile characteristics.

27. The system of claim 26, wherein the three-dimensional characteristics provide distinctive tactile feedback indicative of a polysemous symbol to a user.

28. The system of claim 23, wherein at least one of the plurality of polysemous symbols is at least partly provides electrically activated vibratory or haptic feedback.

29. The system of claim 23, wherein a shape of a polysemous symbol is used to provide distinctive tactile feedback indicative of a polysemous symbol to a user.

30. The system of claim 23, wherein topography of a polysemous symbol is used to provide distinctive tactile feedback indicative of a polysemous symbol to a user.

31. The system of claim 23, wherein a polysemous symbol including one or more tactile features is placed in a constant location of the keyboard as a reference point to enhance tactual navigation of the keyboard.

32. The system of claim 23, wherein auditory feedback is provided for less than all of the plurality of keys on the keyboard.

33. The system of claim 23, wherein vibration, localized at a site of one or more keys of the keyboard, provides tactile feedback to the user to indicate which validly selectable keys.

34. The system of claim 23, wherein after actuation of an initially detected symbol, only keys which can produce a stored message involving that initially detected symbol are made validly selectable.

35. The system of claim 34, wherein vibration, localized at a site of one or more keys of the keyboard, provides tactile feedback to the user to indicate the validly selectable keys.

36. The system of claim 23, wherein one or more keys of the keyboard includes at least one moving part such that movement of the at least one moving part is used to provide distinctive tactile feedback indicative of a polysemous symbol to a user.

37. The system of claim 23, wherein at least one of color and other visual characteristics of a symbol is used to provide distinctive tactile feedback indicative of a polysemous symbol to a user.

38. The system of claim 23, further comprising:
a memory to store polysemous symbol sequences in association with a word, phoneme or plural word message.

39. The system of claim 23, further comprising:
an output device to output the accessed word, phoneme or plural word message.

40. The system of claim 38, further comprising:
an output device to output the accessed word, phoneme or plural word message.

41. The system of claim 39, wherein the output device is further configured to provide an audible output upon selection of one of the polysemous symbols, the audible output corresponding to a category represented by the selected polysemous symbol.

42. The system of claim 41, wherein the output device is further configured to provide a second audible output, upon selection of a subsequent one of the polysemous symbols, the audible output corresponding to a subcategory represented by the sequenced selected polysemous symbols.

43. The system of claim 23, wherein the keyboard includes one or more tactile elements, in addition to the plurality of polysemous symbols, usable as a guide during manual exploration of the keyboard.

44. The system of claim 23, wherein at least two of the keys are associated with polysemous symbols of different textures to provide distinctive tactile feedback to the user.

45. A method of translating representational characteristics of a polysemous graphic symbol into a tactile format, the method comprising:
determining a plurality of stored words, phonemes, messages or sentences associated with a polysemous graphic symbol of a system, the plurality of stored words, phonemes, messages or sentences being respectively accessible by actuation of the polysemous graphic symbol in sequence with respective other polysemous graphic symbols;
identifying associations between the polysemous graphic symbol and the plurality of determined stored words, phonemes, messages or sentences; and
translating representational characteristics of the polysemous graphic symbol into tactile format of a tactile polysemous symbol to be associated with the determined plurality of stored words, phonemes, messages or sentences, tactile characteristics of the tactile polysemous symbol relating to the identified associations and each of the polysemous graphic symbols being at least one of engraved and embossed on a respective surface of a respective one of a plurality of keys of a hardware keyboard to provide distinctive tactile feedback, indicative of a respective polysemous graphic symbol, is provided upon a user contacting the respective polysemous graphic symbol on the key, wherein the keyboard includes one or more tactile elements, in addition to the plurality of polysemous symbols, usable as a guide during manual exploration of the keyboard.

46. The method of claim 45, further comprising:
positioning the developed tactile polysemous symbol on a key of a keyboard associated with the polysemous graphic symbol, effectively replacing the polysemous graphic symbol with the polysemous tactile symbol to access respective ones of the determined plurality of stored words, phonemes, messages or sentences when sequenced with respective other tactile polysemous symbols.

47. The method of claim 45, wherein the identified associations include teachable metaphors.

48. The method of claim 45, wherein the identified associations include associations with a plurality of linguistic concepts relating to the stored words, phonemes, messages or sentences and the polysemous graphic symbol.

49. The method of claim 47, wherein the teachable metaphors are useable to explain associations between the polysemous graphic symbol and underlying linguistic concepts.

50. The method of claim 49, wherein the identified associations include associations with a plurality of linguistic concepts relating to the stored words, phonemes, messages or sentences and the polysemous graphic symbol.

51. The method of claim 50, wherein the teachable metaphors are useable to explain associations between the polysemous graphic symbol and underlying linguistic concepts.

52. The method of claim 45, wherein at least two of the keys are associated with polysemous symbols of different textures to provide distinctive tactile feedback to the user.

* * * * *